US012749200B2

(12) United States Patent
Ryan et al.

(10) Patent No.: US 12,749,200 B2
(45) **Date of Patent: *Sep. 29, 2026**

(54) METHODS AND SYSTEM FOR OBJECT PATH DETECTION IN A WORKPLACE

(71) Applicant: VergeSense, Inc., Mountain View, CA (US)

(72) Inventors: Dan Ryan, Mountain View, CA (US); Kelby Green, Mountain View, CA (US)

(73) Assignee: VergeSense, Inc., Mountain View, CA (US)

( * ) Notice: Subject to any disclaimer, the term of this patent is extended or adjusted under 35 U.S.C. 154(b) by 204 days.

This patent is subject to a terminal disclaimer.

(21) Appl. No.: 18/811,326

(22) Filed: Aug. 21, 2024

(65) Prior Publication Data

US 2024/0412380 A1 Dec. 12, 2024

Related U.S. Application Data

(63) Continuation of application No. 17/751,494, filed on May 23, 2022, now Pat. No. 12,100,164.

(Continued)

(51) Int. Cl.
*G06T 7/20* (2017.01)
*G06T 7/70* (2017.01)
(Continued)

(52) U.S. Cl.
CPC .................. *G06T 7/20* (2013.01); *G06T 7/70* (2017.01); *G06V 20/40* (2022.01); *G06V 20/52* (2022.01);
(Continued)

(58) Field of Classification Search
CPC ... G06T 7/20; G06T 7/70; G06T 2207/10016; G06T 2207/30196; G06T 2207/30232;
(Continued)

(56) References Cited

U.S. PATENT DOCUMENTS

2015/0254870 A1* 9/2015 Knibbe ..................... G06T 7/20 345/633
2018/0324393 A1* 11/2018 Ryan ...................... H04N 7/188
(Continued)

*Primary Examiner* — Abhishek Sarma
(74) *Attorney, Agent, or Firm* — Run8 Patent Group, LLC; Peter Miller

(57) ABSTRACT

A method for detecting object paths in a workplace, at a sensor block, includes responsive to detecting absence of motion, capturing an initial sequence of frames at a baseline frame rate at a camera and for each frame in the initial sequence of frames: detecting an initial constellation of objects; and transmitting a container representing the initial constellation of objects to a computer system. The method further includes, responsive to detecting motion: capturing a frame at the baseline frame rate at the camera; detecting a first constellation of objects, including a set of humans, in the frame; calculating a quantity of humans; transitioning the camera to a first frame rate; capturing a second sequence of frames at the first frame rate; detecting a second constellation of objects in the second sequence of frames; deriving a set of object paths; and transmitting the set of object paths to the computer system.

20 Claims, 7 Drawing Sheets

Related U.S. Application Data

(60) Provisional application No. 63/197,922, filed on Jun. 7, 2021.

(51) Int. Cl.

| | |
|---|---|
| ***G06V 20/40*** | (2022.01) |
| ***G06V 20/52*** | (2022.01) |
| ***G06V 40/20*** | (2022.01) |
| ***H04N 7/18*** | (2006.01) |
| ***H04N 23/611*** | (2023.01) |
| ***H04N 23/951*** | (2023.01) |

(52) U.S. Cl.
CPC ............. *G06V 40/20* (2022.01); *H04N 7/188* (2013.01); *H04N 23/611* (2023.01); *H04N 23/951* (2023.01); *G06T 2207/10016* (2013.01); *G06T 2207/30196* (2013.01); *G06T 2207/30232* (2013.01); *G06T 2207/30242* (2013.01)

(58) Field of Classification Search
CPC . G06T 2207/30242; G06T 2207/30241; G06T 7/246; G06V 20/40; G06V 20/52; G06V 40/20; G06V 20/53; H04N 7/188; H04N 23/611; H04N 23/951; H04N 23/667
See application file for complete search history.

(56) References Cited

U.S. PATENT DOCUMENTS

| | | | | |
|---|---|---|---|---|
| 2019/0156496 | A1* | 5/2019 | Leduc | G06V 10/62 |
| 2019/0228624 | A1* | 7/2019 | Kostrun | F21V 23/0478 |
| 2019/0313058 | A1* | 10/2019 | Harrison | G06T 7/194 |
| 2020/0327315 | A1* | 10/2020 | Mullins | G06V 40/103 |
| 2020/0349345 | A1* | 11/2020 | Hodge | G06V 20/59 |
| 2021/0110193 | A1* | 4/2021 | Green | G06F 18/2411 |
| 2021/0279475 | A1* | 9/2021 | Tusch | G06V 20/53 |
| 2022/0379474 | A1* | 12/2022 | Vu | G06T 17/10 |

* cited by examiner

METHODS AND SYSTEM FOR OBJECT PATH DETECTION IN A WORKPLACE

CROSS-REFERENCE TO RELATED APPLICATIONS

This application is a continuation application of U.S. patent application Ser. No. 17/751,494, filed on 23 May 2022, which claims the benefit of U.S. Provisional Application No. 63/197,922 filed on 7 Jun. 2021, each of which is incorporated in its entirety by this reference.

This application is related to U.S. patent application Ser. No. 10/742,940, filed on 7 May 2018, and U.S. patent application Ser. No. 16/845,525, filed on 10 Apr. 2020, both of which are incorporated in its entirety by this reference.

TECHNICAL FIELD

This invention relates generally to the field of workplace monitoring and more specifically to a new and useful method for object path detection in the field of workplace monitoring.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. First Method

As shown in FIGS. 1A, 1B, 2, and 4, a first method S100 for detecting object paths in a workplace includes, at a sensor block during an initial time period: in response to detecting absence of motion in a field of view of a motion sensor arranged in the sensor block, capturing an initial sequence of frames at a baseline frame rate at a camera arranged in the sensor block in Block S112; and, for each frame in the initial sequence of frames, detecting an initial constellation of objects in the frame in Block S113 and transmitting a container representing the initial constellation of objects detected in the frame to a computer system in Block S120. The first method S100 also includes, during a first time period, in response to detecting motion in the field of view of the motion sensor: capturing a first frame at the camera at the baseline frame rate in Block S111; detecting a first constellation of objects in the first frame, the first constellation of objects including a first set of humans in Block S113; calculating a first quantity of humans based on the first set of humans in the first frame in Block S114; and transitioning the camera to a first frame rate, greater than the baseline frame rate, based on the first quantity of humans in Block S115. The first method S100 further includes, during a second time period succeeding the first time period, in response to detecting motion in the field of view of the motion sensor: capturing a second sequence of frames at the first frame rate in Block S112; detecting a second constellation of objects in the second sequence of frames in Block S113; deriving a first set of object paths representing movement of the second constellation of objects within the field of view of the camera based on positions of the second constellation of objects detected in the second sequence of frames in Block S116; and transmitting the first set of object paths to the computer system in Block S120.

Figure 2:
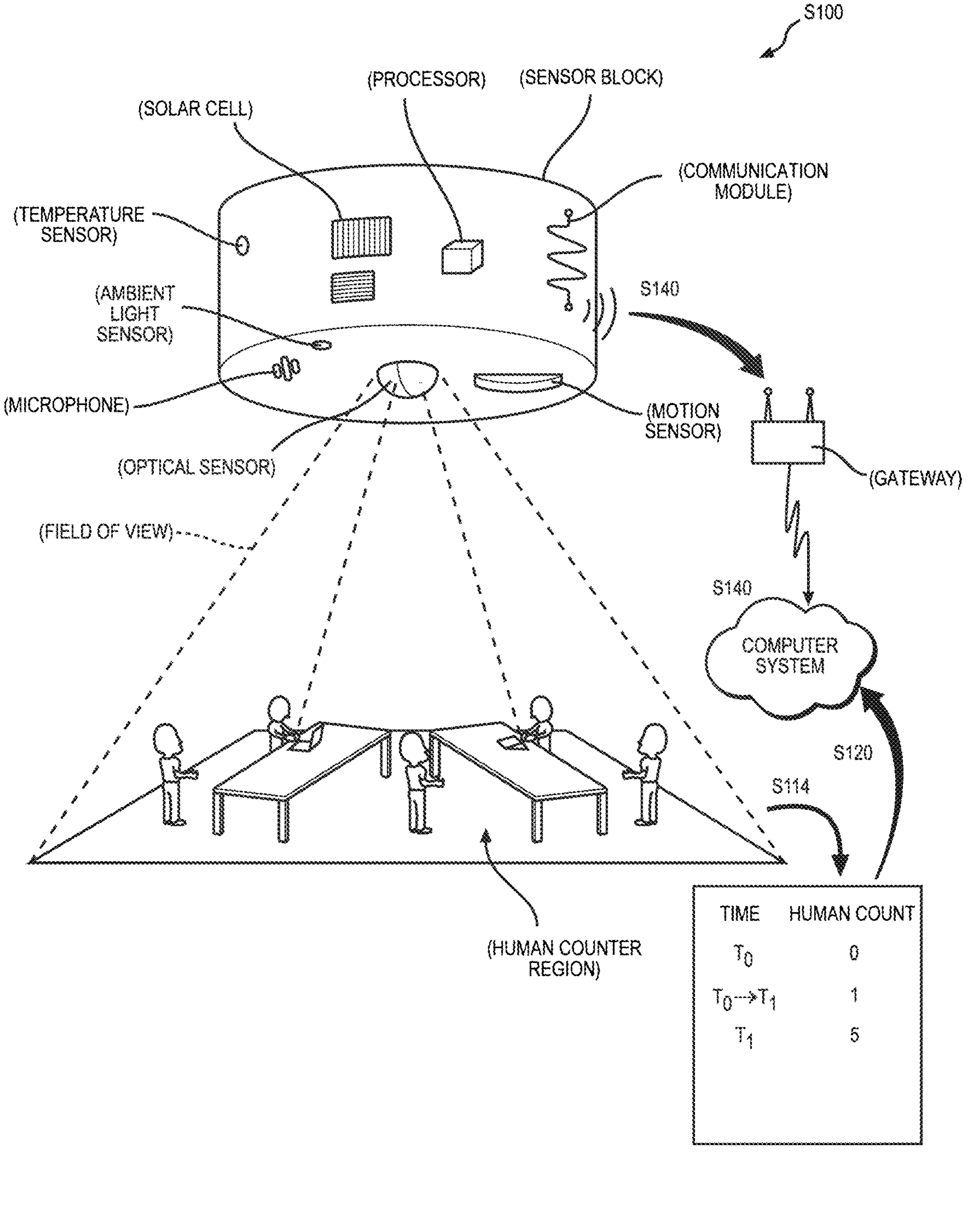
FIG. 2 is a schematic representation of a first method.
Figure 4:
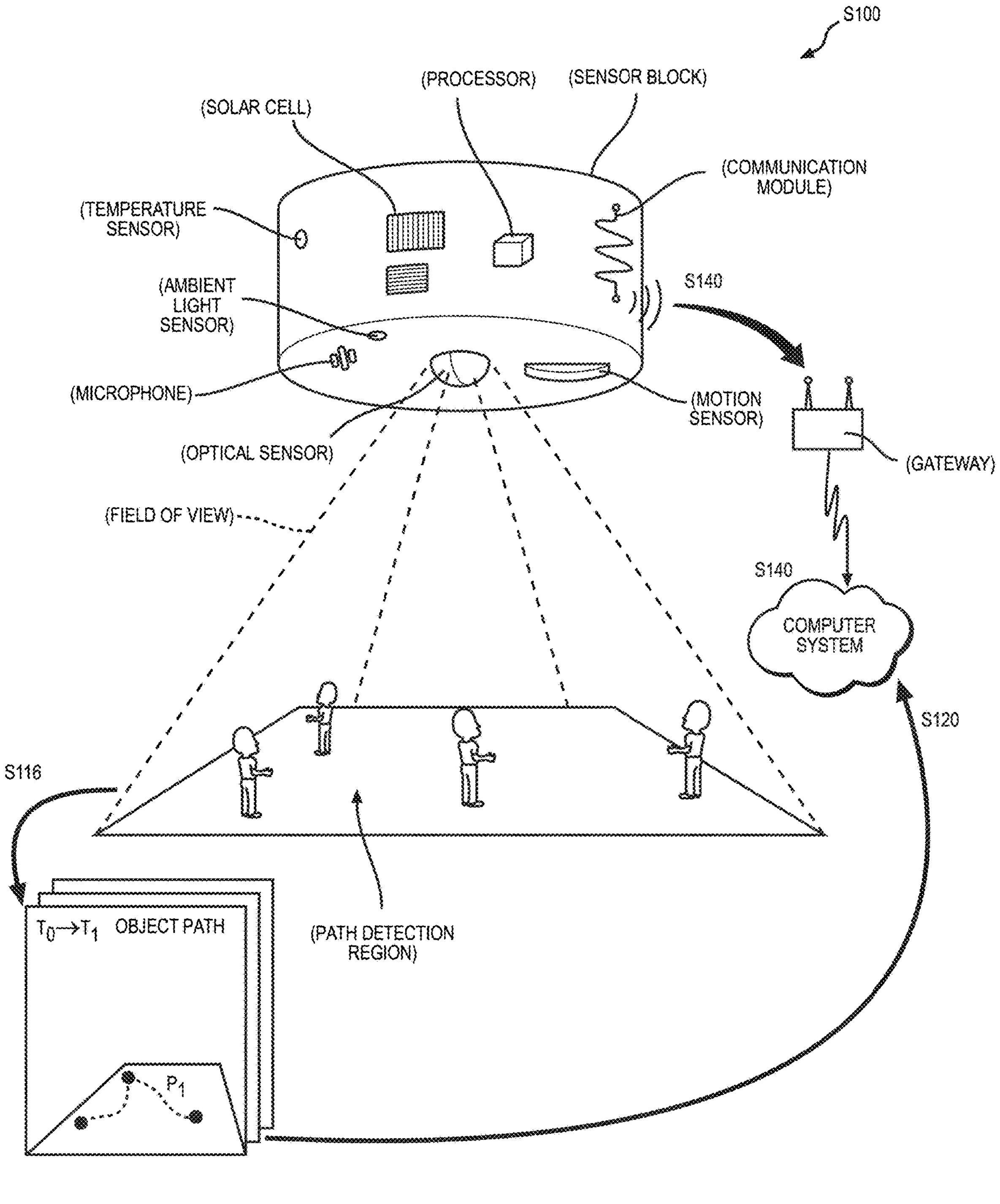
FIG. 4 is a schematic representation of one variation of the first method.

As shown in FIGS. 2 and 4, one variation of the first method S100 includes, during an initial time period, at a first sensor block including a first motion sensor defining a first field of view intersecting a path detection region in response to detecting absence of motion in the path detection region: capturing an initial sequence of frames at a baseline frame rate at a first camera arranged in the first sensor block in Block S112; and, for each frame in the initial sequence of frames, detecting an initial constellation of objects in the frame in Block S113 and transmitting an initial container representing the initial constellation of objects detected in the frame to a computer system in Block S120. The first method S100 also includes, during the initial time period, at a second sensor block including a second motion sensor defining a second field of view intersecting a human counter region abutting the path detection region, in response to detecting motion in the human counter region: capturing a first frame at the baseline frame rate at a second camera arranged in the second sensor block in Block S111; detecting a first constellation of objects in the first frame, the first constellation of objects including a first set of humans in Block S113; calculating a first quantity of humans based on the first set of humans in the first frame in Block S114; and transitioning the second camera to a first frame rate, greater than the baseline frame rate, based on the first quantity of humans in Block S115. The first method S100 further includes, during a first time period, at the first sensor block, in response to detecting motion in the path detection region: capturing a first sequence of frames at the first camera at the first frame rate in Block S112; detecting a second constellation of objects in the first sequence of frames in Block S113; deriving a first set of object paths representing movement of the second constellation of objects within the field of view of the first camera based on positions of the second constellation of objects detected in the first sequence of frames in Block S116; and transmitting the first set of object paths to the computer system in Block S120.

Figure 1A:
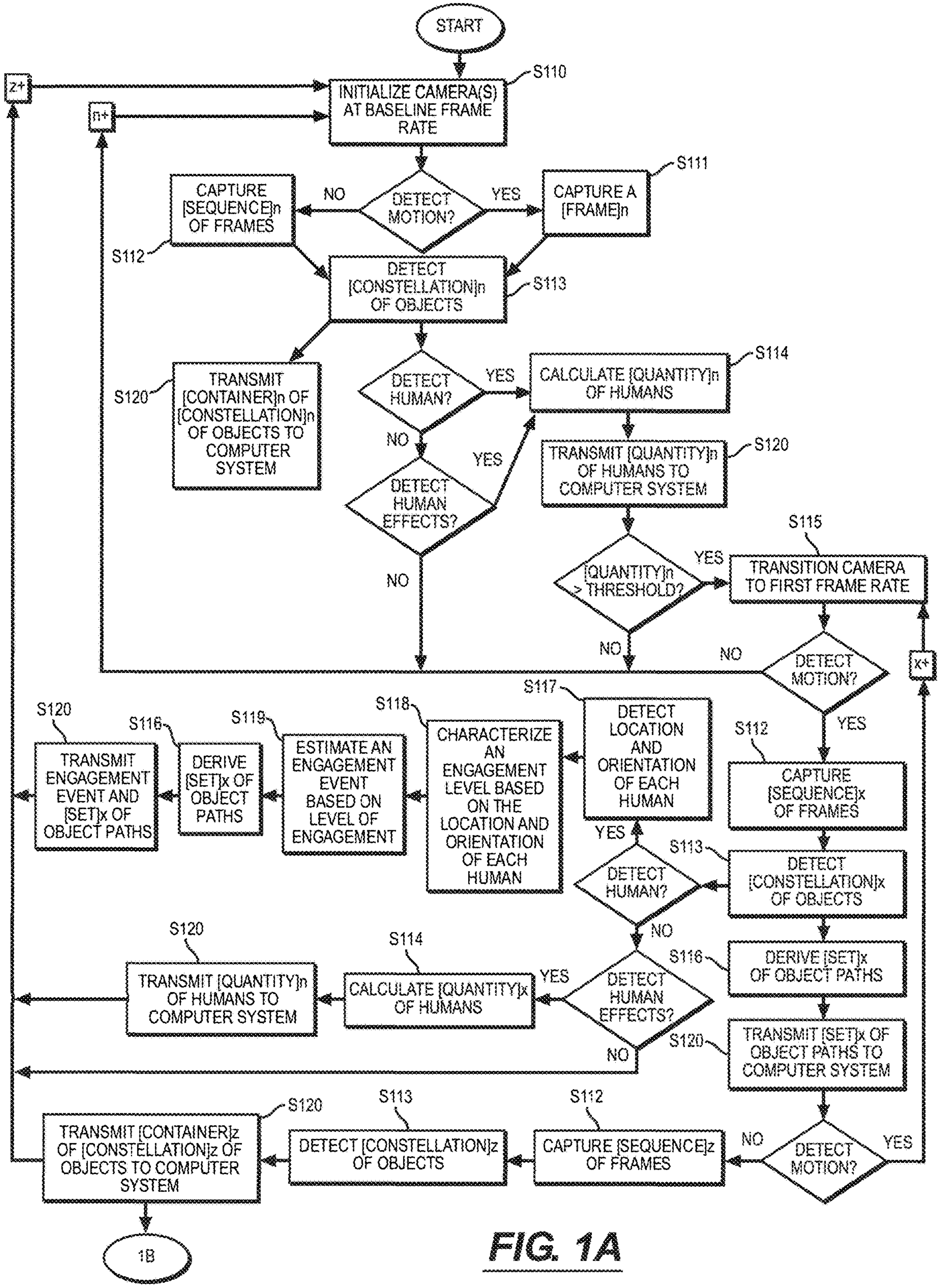
FIG. 1A is a flowchart representation of a first method.
Figure 1B:
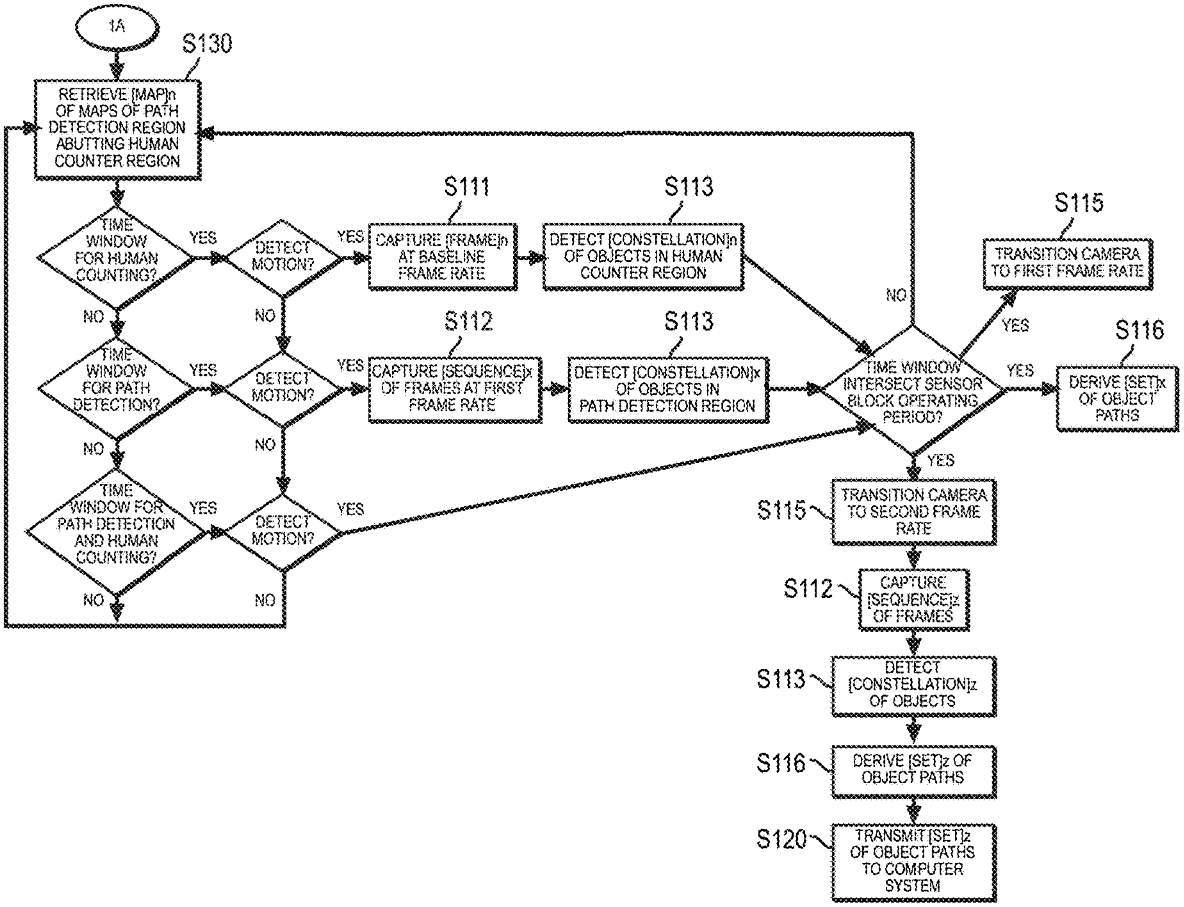
FIG. 1B is a flowchart representation of one variation of the first method.
Figure 3:
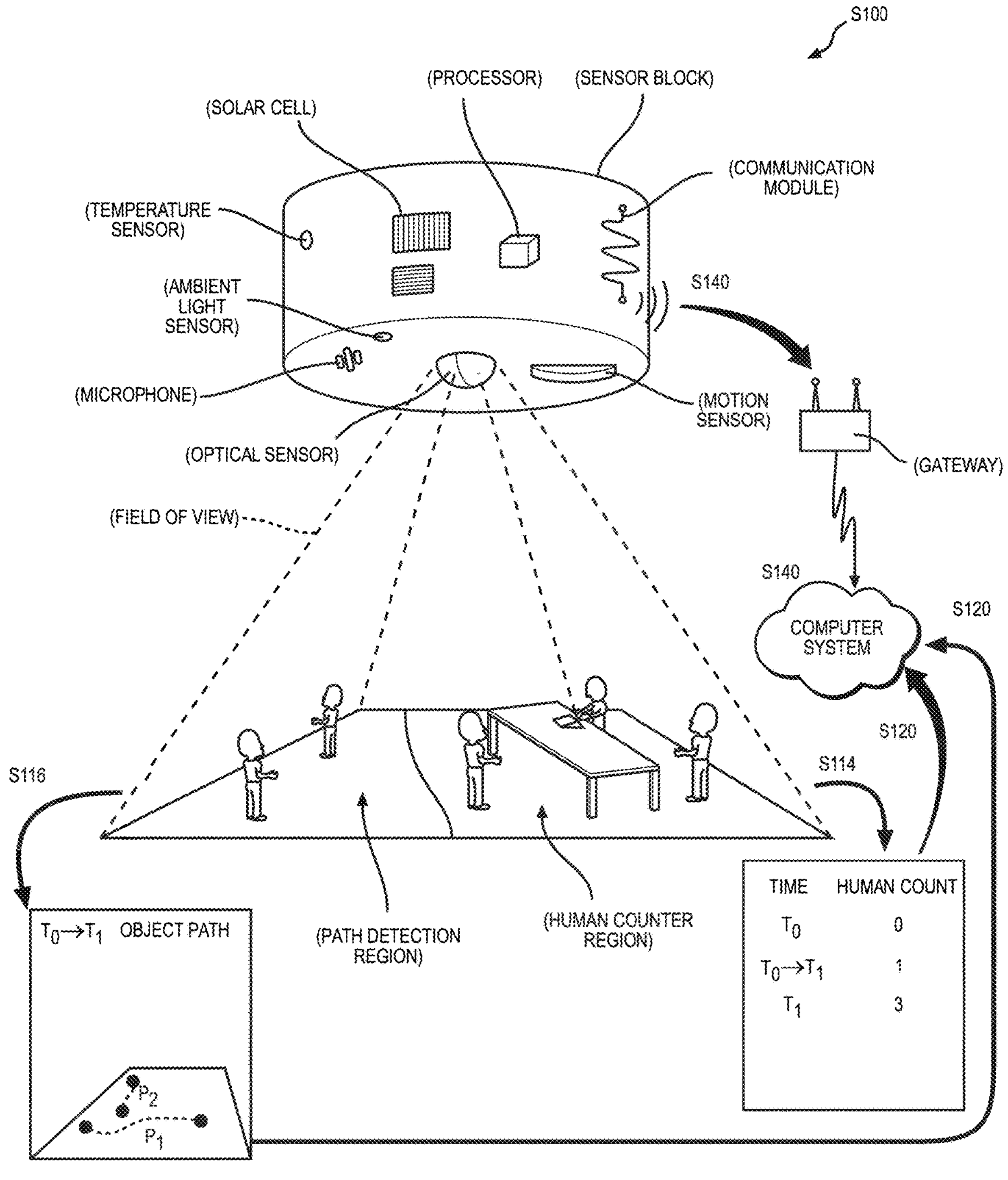
FIG. 3 is a schematic representation of one variation of the first method.

As shown in FIGS. 1A, 1B, and 3, another variation of the first method S100 includes, during an initial time period, at a sensor block including a motion sensor defining a field of view intersecting a path detection region and a human counter region abutting the path detection region, in response to detecting absence of motion in the path detection region and in the human counter region: capturing an initial sequence of frames at a baseline frame rate at a camera arranged in the sensor block in Block S112; and, for each frame in the initial sequence of frames, detecting an initial constellation of objects in the frame in Block S113, and transmitting a container representing the initial constellation of objects detected in the frame to a computer system in Block S120. The first method S100 also includes, during a first time period, at the sensor block, in response to detecting motion in the human counter region and in response to detecting absence of motion in the path detection region: capturing a first sequence of frames at a first frame rate greater than the baseline frame rate in Block S112; detecting a first constellation of objects intersecting the human counter region within the first sequence of frames, the first constellation of objects including a first set of humans in Block S113; detecting a first quantity of humans present in the human counter region based on the first set of humans in the first sequence of frames in Block S114; and transmitting the first quantity of humans to the computer system in Block S120. The first method S100 further includes, during a second time period, at the sensor block, in response to detecting motion in the path detection region: capturing a second sequence of frames at the first camera at a second frame rate greater than the first frame rate and the baseline frame rate in Block S112; detecting a second constellation of objects intersecting the path detection region within the second sequence of frames in Block S113; deriving a first set of object paths representing movement of the second constellation of objects within the path detection region based on positions of the second constellation of objects detected in the second sequence of frames in Block S116; and transmitting the first set of object paths to the computer system in Block S120.

2. Applications

Generally, Blocks of the first method S100 can be executed by a population of sensor blocks—each including a video-capable image sensor—installed within a workplace, such as within a conference room, an agile work environment, a cafeteria, or a lounge, etc. within a facility. In particular, each sensor block (or cluster of sensor blocks) can execute Blocks of the first method to: capture a video feed depicting regions (e.g., path detection region, human counting region) within the workplace via its integrated image sensor; detect constellations of objects (e.g., humans, human effects) in the video; calculate a quantity of humans in a human counting region within the workplace; derive paths of objects moving throughout a path detection region within the workplace; estimate engagement events occurring between humans during the duration of the video; and adjust the frame rate of the image sensor based on the quantity of humans detected and/or based on the time of day. The sensor block can thus execute Blocks of the first method to: reduce its data processing, data transport, and storage overhead, return contextual object presence, human presence, and human path data to a computer system for delivery to a user or administrator, and enable the user to achieve and maintain awareness of usage of the workplace and object movement within the workplace with no or minimal exposure of private employee (or "worker") information to the user or other viewer.

More specifically, the first method S100 can be executed by a sensor block to compress a video feed captured by an image sensor (or "camera") in the sensor block into an anonymized set of object paths through select regions (e.g., path detection region, human counting region) of the workplace within the field of view of the image sensor. The sensor block can offload these low-data-density, anonymized object paths to a computer system, which can then process and present these objects to the user. In particular, the sensor block can compress a video feed depicting a portion of the field of view of its image sensor into an information-dense, anonymized, lightweight, path-based data structure (or data "stream") and offload these data to the computer system. The computer system can compile these data received from many sensor blocks into an aggregate anonymized representation of humans and objects moving through the workplace, thereby enabling faster video-data management, and faster detection that is less prone to overtraining.

For example, in addition to periodically capturing static images and deriving instantaneous states of a region of a workspace within the field of view of the image sensor and utilization of the space and assets contained therein, the sensor block can further execute Blocks of the first method to: detect transient conditions within the workspace and modify (e.g., increase) frame rate of the image sensor; and detect and characterize motion-based events and asset utilization within the space accordingly.

Similarly, the sensor block can detect transient events indicative of a well-functioning workplace. For example, the sensor block can: detect motion in the field of view of its image sensor; capture a sequence of frames via the image sensor in response to detecting this motion; detect humans in these frames; interpret engagement between these humans based on their relative locations, orientations (e.g., alignment and proximity of the anteroposterior axes), and motions; store these engagements as anonymized social interactions (or "engagement events") between humans within the workplace; and offload times and locations of these anonymized social interactions to the computer system. The computer system can further quantify complex concepts from such engagement events detected by many sensor blocks, such as collaboration across a workforce, level-of-focus within a workforce, and other target outcomes of flexible work environments. The sensor blocks can thus cooperate with the computer system to enable workplace or facility administrators to execute more educated adjustments to the quantity or position of assets within a workplace in order to increase productivity, reduce distractions, and improve other target outcomes within the workplace.

Additionally, by compressing video feeds into an object path data format according to the first method S100, a population of sensor blocks deployed within a workplace can cooperate to: reduce data transport and storage overhead required to manage a large-scale deployment of video-capable sensor blocks within the workplace; derive high-quality inferences of object presence, human presence, and human motion within the space; and maintain inherent anonymity of humans occupying the space.

More specifically, by deriving and manipulating object paths of objects in a region within the workplace, the sensor block can remove or eliminate identifying human features from data subsequently offloaded from the sensor block to the computer system. Thus, sensor block can execute Blocks of the first method S100 to achieve a high degree of privacy despite deployment of image sensors within the workplace.

The first method S100 is described herein as executed by a sensor block to detect, track, quantify, and manage objects within a workspace, such as an office or clinic. However, a sensor block can similarly execute Blocks of the first method S100 to detect, track, quantify, and manage objects within an industrial, educational, municipal, or other space or setting.

2.1 Terms

The first method S100 is described herein as executed by a sensor block to detect objects such as humans or "human effects" within the field of view of the camera arranged in the sensor block. The sensor block can detect "human effects" that can include personal items or other objects carried by humans in a workplace environment and that are detectable via Blocks of the first method S100 described below. These "human effects" or personal items can include but are not limited to: laptop computers; tablet computers; smartphones; keyboards; electronic mice; charging and/or data transfer cables; beverage and/or food containers such as lunch boxes, thermoses, coasters; utensils such as plates, bowls, forks, knives, spoons; tissues, napkins and/or other sanitary supplies; personal fans; headphones; earphones; paperweights; staplers; personal plants; clothing such as shoes, jackets, hats, and/or other wearable accessories; eye glasses; glasses cleaners; glasses cases; virtual reality goggles; seat cushions; tools such as hand tools and straight edges; keys and keychains; wallets; pens or pencils; erasers; books; booklets; notebooks; notepads; sticky-notes; loose paper; organizational tools such as mail trays, folders, and/or binders; lamps; clocks; and/or whiteboards.

3. Sensor Block

As shown in FIGS. 2, 3 and 4, a sensor block can include: an image sensor (e.g., a color or "RGB" CCD or CMOS camera) defining a field of view; a motion sensor configured to detect motion in or near the field of view of the camera; a processor configured to extract data from images and/or frames recorded by the camera; a wireless or wired communication module configured to transmit data extracted from images; a battery or wired power supply configured to power the camera, the processor, and the wireless communication module; and an housing configured to contain the camera, the motion sensor, the processor, the communication module, and the power supply and configured to mount to a surface in order to define a field of view of the camera intersecting a region within the workplace (e.g., a human counter region of a conference room, a path detection region of a thoroughfare and/or hallway abutting the conference room, a human counter region of a cluster of agile desks in an agile work environment).

The camera can be configured: to record and output a set of 2D color frames (e.g., at a rate of at least one frame per-second); to record and output a set of 2D depth images or 3D point clouds. However, the camera can define any other type of image sensor and can output visual or optical data in any other format.

The motion sensor can include a passive infrared sensor (or "PIR" sensor) that defines a field of view intersecting the field of view of the camera and that passively outputs a signal representing motion within (or near) the field of view of the camera. The sensor block can transition from an inactive state to an active state responsive to an output from the motion sensor indicating motion in the field of view of the motion sensor; the sensor block can then trigger the camera to record a set of frames, which may capture a source of the motion detected by the motion sensor.

In one example, the motion sensor is coupled to a wake interrupt pin on the processor. However, the motion sensor can define any other type of motion sensor and can be coupled to the processor in any other way to trigger the sensor block to enter an image-capture mode, responsive to motion in the field of view of the motion sensor.

In one variation, the sensor block also includes: a distance sensor (e.g., a 1D infrared depth sensor); an ambient light sensor; a temperature sensor; an air quality or air pollution sensor; and/or a humidity sensor. However, the sensor block can include any other ambient sensor. The sensor block can sample and record data from these sensors and can selectively transmit these data—paired with path-based data extracted from frames recorded by the camera—to a local gateway. The sensor block can also include a solar cell or other energy harvester configured to recharge the battery.

The processor can locally execute Blocks of the first method S100, as described herein, to record sets of frames via the camera, to identify presence and paths of objects (e.g., humans, human effects) in the set of frames, and to then enqueue the communication module to transmit these object data to a nearby gateway for distribution to the computer system.

The camera, motion sensor, battery, processor, and wireless communication module, etc. can be arranged within a single housing configured to install on a flat surface—such as by adhering or mechanically fastening to a wall or ceiling—with the field of view of the camera facing outwardly from the flat surface and intersecting a region within the workplace (e.g., facility).

However, this "standalone," "mobile" sensor block can define any other form and can mount to a surface in any other way.

3.1 Wired Power and Communications

In one variation, the sensor block additionally or alternatively includes a receptacle or plug configured to connect to an external power supply within the facility—such as a power-over-Ethernet cable—and sources power for the camera, processor, etc. from this external power supply. In this variation, the sensor block can additionally or alternatively transmit data—extracted from images and/or frames recorded by the sensor block—to the computer system via this wired connection (i.e., rather than wirelessly transmitting these data to a local gateway).

4. Local Gateway

As shown in FIGS. 2, 3 and 4, the first method S100 can also include a local gateway: configured to receive data transmitted from sensor blocks nearby via a wireless or wired communication protocol or via a local ad hoc wireless network; and to pass these object path data and/or human counting data to the computer system, such as over a computer network or long-range wireless communication protocol. For example, the gateway can be installed near and connected to a wall power outlet and can pass data received from a nearby sensor block to the computer system in (near) real-time. Furthermore, multiple gateways can be installed throughout the facility and can interface with sets of sensor blocks installed nearby to collect data from these sets of sensor blocks and to return these data to the computer system.

In one variation, a sensor block transmits frames—recorded by the camera during a scan cycle executed by the sensor block while in an active state—to a nearby gateway. The gateway executes Blocks of the first method S100 described herein to extract object paths and other insights from these frames and to return these insights to the computer system (i.e., rather than raw or compressed frames). Alternatively, the sensor block can transmit frames to the computer system via the gateway, and the computer system can execute Blocks of the first method to derive object paths from these frames.

5. Sensor Block Output

Generally, once deployed in a space, a sensor block can capture images (or "frames") depicting a nearby region of the space, extract non-optical data from these frames, extract characteristics of constellations of objects detected in these frames, compile and annotate these data, and transmit these data to the computer system. More specifically, the sensor block can set sampling frequency (e.g., adjust the frame rate of the camera) based on conditions within its field of view, such as: once per ten-minute interval when the sensor block detects absence of motion in its field of view; once per one-minute interval when the sensor block detects motion in a human counter region of the field of view of the sensor block; or once per one-second interval when the sensor block detects motion in a path detection region in its field of view. During each sampling period, the sensor block can: capture a frame; extract features in the frame; detect and classify types of objects (e.g., humans, human effects, office furniture, other assets) in the field of view of the sensor block based on these features; extract locations, orientations, and positions of these objects in the field of view of the sensor blockbased on positions of corresponding features in the frame; and/or estimate engagement events between humans detected in this frame based on their relative positions and orientations. The sensor block can also: annotate the quantity and locations of these humans and other objects with a timestamp of the frame and an unique identifier (e.g., a UUID, MAC address, IP address, or other wireless address, etc.) of the sensor block; and transmit these data to the computer system, such as via a wired or wireless connection (e.g., via the local gateway).

The sensor block can additionally or alternatively: repeat these processes over multiple consecutive sampling periods; track objects between constellations of objects detected in consecutive frames captured over short time intervals; derive paths of these objects (e.g., humans, human effects) over corresponding time intervals based on their relative positions detected in these frames; and transmit these object paths to the computer system.

In one variation, the sensor block can further: derive speeds and/or velocities of these objects from these object paths; extract dimensions (e.g., length, width, height, magnitude, etc.) of these objects from these frames; offload these object motions and characteristics to the computer system; and/or automatically modify the frame rate of the camera based on these object motions and characteristics.

6. Computer System

As shown in FIGS. 2, 3, and 4, the computer system, such as a remote server, can receive non-optical data (e.g., object locations and orientations, quantity of humans, object paths) from one or more gateways installed in the facility (or directly from sensor blocks) and can manipulate these non-optical data to generate long-term insights of object movement throughout regions within the workplace and/or real-time outputs of quantities of humans and/or engagement events of humans according to Blocks of the first method S100 described below.

7. Installation and Initialization

Generally, an administrator of the workplace can install a sensor block such that the field of view of the camera of the sensor block intersects a region (e.g., human counting region, path detection region) of the workplace. Each region can be defined with boundaries and labeled as a human detection region or a path detection region, in a set of maps of the workplace, by the administrator. Furthermore, both the path detection region and the human counter region can change as a function of time. For example, time windows—such as during work hours (e.g., 9 am-6 pm), before work hours (e.g., 6 am-9 am, after work hours (e.g., 7 pm-6 am)—can be assigned by the administrator to the set of maps for path detection and human counting. Each map can further define discrete path detection regions and human counter regions, within the workplace, and can be assigned to a particular time window.

Additionally or alternatively, upon installation of the sensor block over the region, the sensor block can capture an initialization image in Block S110, at the camera, of the region in order to identify static assets within the region and/or to label various areas of the region (defined by pixel regions within the field of view of the camera) with locational context in the set of maps of the workplace.

More specifically, the sensor block can capture an initialization image at the camera at a time when the region is known to be vacant and in a default state (e.g., after cleaning or maintenance is performed within the region, after working hours). In one implementation, the sensor block can record multiple initialization images at the camera in multiple lighting conditions to better facilitate object detection across these lighting conditions.

In another implementation, the sensor block can automatically (e.g., via an object classification model) classify various static assets (e.g., desks, couches, printers/copiers, kitchen appliances, doors to other spaces in the facility) within a region of the workplace based on the initialization image captured by the sensor block. Alternatively, an administrator of the workplace can manually label static assets within the region on the set of maps for future reference by the sensor block.

In another implementation, the sensor block can automatically (e.g., via a locational context model) classify areas of the region as corresponding to particular location types in a set of location types based on the initialization image. For example, the set of location types can include, conference room, agile desk area, recreational area, hallway, kitchen, etc. Alternatively, an administrator of the workplace can manually label various areas of the region on a third map as a location type in the set of location types.

Therefore, the sensor block can generate or retrieve locational context and time windows of regions and assets, based on the initialization image and/or the set of maps of the workplace, to inform object detection, human quantity calculations, and object path derivations in Blocks of the first method S100 further described below.

8. Video Capture+Frame Rate

Generally, during a given time period, the sensor block can capture a frame and/or a sequence of frames at a camera depicting a region of the workplace, in response to absence of motion and/or presence of motion in the field of view of a motion sensor arranged in the sensor block.

In one implementation, the camera can capture frames at a frequency greater than one hertz in order to properly derive paths of objects (e.g., humans, human effects) moving through a region of the workplace. Additionally or alternatively, the camera can capture a sequence of low-resolution frames and transmit the sequence of frames to the local gateway or the computer system. In yet another implementation, the sensor block can temporarily and locally store frames until the sensor block calculates a quantity of humans and derived object paths based on a single frame and/or a sequence of frames, at which time, the sensor block can delete the single frame and/or sequence of frames from temporary storage.

Therefore, the sensor block can address privacy concerns related to the deployment of sensor blocks within the facility by reducing the possibility of accessing or recovering the optical data captured by the camera in each sensor block.

8.1 Object Path Derivation: Frame Rate+Object Velocity

Generally, the sensor block can accurately track and/or detect a constellation of objects across a sequence of frames. Since the sequence of frames can be captured by a camera at a high frame rate (e.g., one frame per ten seconds, one frame per second), the sensor block can also generate object paths representing movement of the constellation of objects based on positions of the constellation of objects.

In one implementation, Blocks of the first method S100 can be executed by the sensor block to correlate an object present in multiple frames based on positional overlap of the object in a sequence of consecutive frames. Furthermore, the sensor block can adjust the frame rate of the camera (or select image sensor hardware) in order to capture movement up to a predetermined speed (e.g., velocity) provided by an administrator of the workplace. For example, assuming a one-meter bounding box dimension for humans detected within the frame and an estimated speed of a human of one meter-per-second, the sensor block can transition the camera to the first frame rate (e.g., one frame per minute) or to a faster, second frame rate (e.g., one frame per ten seconds, one frame per second) to ensure bounding box overlap of a human detected in consecutive images.

In one variation, once the sensor block has correlated objects across multiple consecutive frames to identify these objects as a single mobile object, the sensor block can derive an object path for the object based on positions of the object detected in the sequence of consecutive frames.

For example, during a first time period, the sensor block can capture a first frame and a second frame at the camera at a first frame rate. Then, during a second time period succeeding the first time period, the sensor block can derive a velocity of a first object in the field of view of the camera based on changes in position of the first object between the first frame and the second frame. Later, during a third time period succeeding the second time period, the sensor block can: transition the camera to a second frame rate, greater than a baseline frame rate and a first frame rate, proportional to the velocity of the first object; capture a sequence of frames at the second frame rate; detect a constellation of objects in the sequence of frames; derive a set of object paths representing movement of the constellation of objects within the field of view of the camera based on positions of the constellation of objects detected in the sequence of frames; and transmit the set of object paths to the computer system.

However, the sensor block can derive object paths via any interpolation or smoothing algorithm and can represent the positions of the set of object paths—such as a set of vectors, a set of functions, or a series of positions—within the path detection region according to any data format.

Thus, the sensor block can: detect constellations of objects within a path detection region, assuming there is sufficient alignment and/or overlap in the positions of objects in the sequence of consecutive frames; transition the camera to a frame rate proportional to the velocity of an object; and provide a set of object paths with valuable object movement insights.

8.2 Single Sensor Block: Undefined Regions+Frame Rate+Human Count

In one implementation, the sensor block can transition the frame rate of the camera based on a human count (or "a quantity of humans") to capture a frame or sequence of frames of a region in the workplace. In particular, the sensor block can transition the frame rate of the camera in response to a quantity of humans exceeding and/or falling below predefined human quantity thresholds. Furthermore, the sensor block can implement the methods and techniques described above to detect a constellation of objects including a first set of humans, calculate a first quantity of humans based on the first set of humans, and adjust the frame rate of the camera based on the quantity of humans.

In one variation, during an initial time period, the sensor block can capture an initial sequence of frames at the camera at a baseline frame rate (e.g., one frame per ten minutes). Then, during a first time period, the sensor block can transition the camera to a first frame rate (e.g., one frame per one minute interval)—greater than the baseline frame rate—based on the quantity of humans. Then, during a second time period, the sensor block can capture a second sequence of frames at the camera at the first frame rate. Finally, during a third time period, the sensor block can transition the camera back to the baseline frame rate.

For example, at a third time period succeeding the second time period, in response to detecting absence of motion in the field of view of the motion sensor, the sensor block can: capture a third sequence of frames at the camera at the first frame rate; detect a constellation of objects in the third sequence of frames; transmit a container representing the constellation of objects detected in the third sequence of frames to the computer system; and transition the camera to the baseline frame rate.

In another variation, during an initial time period, the sensor block can capture an initial sequence of frames at the baseline frame rate. Then, during a first time period, the sensor block can transition the camera to the first frame rate based on the quantity of humans. Then, during a second time period, the sensor block can prompt the camera to capture a second sequence of frames at the first frame rate. Finally, during a third time period, the sensor block can transition the camera to a second frame rate (e.g., one frame per one second interval, one frame per ten second interval)—greater than the baseline frame rate and the first frame rate—based on the quantity of humans exceeding a predefined human quantity threshold.

For example, in response to the first quantity of humans exceeding a human quantity threshold during a first time period, the sensor block can transition the camera to the first frame rate greater than the baseline frame rate. Then, in response to the first quantity of humans falling below the human quantity threshold, the sensor block can transition the camera to the baseline frame rate.

Therefore, the sensor block can capture relevant human activity, such as human quantity and object movement within regions of the workplace, while transitioning between camera frame rates to reduce power and data overhead of the sensor block.

8.2.1 Example: Human Effects+Frame Rate+Human Count

In the following example, the sensor block can isolate a set of object clusters from the first constellation of objects to detect presence and/or absence of humans and human effects, such as personal items or other objects carried by humans in a workplace environment as described above, in order to derive a quantity of humans and to adjust the frame rate of the camera based on the quantity of humans.

In this example, the sensor block can implement the method and techniques described above to isolate a set of object clusters from the first constellation of objects detected in the first frame. Then, for a first cluster of objects in the set of object clusters, the sensor block can: identify presence of a second set of humans in the first cluster of objects; calculate a second quantity of humans based on the second set of humans; and transmit the second quantity of humans to the computer system. Next, for a second cluster of objects in the set of object clusters, the sensor block can: detect absence of a human and presence of a set of human effects in the second cluster of objects; calculate a quantity of humans occupying the workplace based on presence of the set of human effects; transmit the third quantity of humans to the computer system; and transition the camera to the first frame rate, greater than the baseline frame rate, based on the third quantity of humans.

Thus, the sensor block can detect presence of human effects in a frame, when humans are absent in the frame, to trigger a human count for a quantity of humans and adjust the frame rate of the camera according to this quantity of humans.

8.3 Multiple Sensor Blocks: Defined Regions+Frame Rate+Human Count

In another implementation, a set of sensor blocks (e.g., two sensor blocks) in the population of sensor blocks can be deployed in the workplace where a first camera of the first sensor block has a field of view intersecting a path detection region and a second camera of the second sensor block has a second field of view intersecting a human counter region abutting the path detection region. Both sensor blocks can implement the methods and techniques described above to detect a constellation of objects including a first set of humans, calculate a first quantity of humans based on the first set of humans; derive a set of object paths representing movement of the constellation of objects; and then transition the frame rate of each camera based on the quantity of humans and/or based on the presence or absence of motion.

In one variation, the first sensor block can implement the method and techniques described above in response to detecting absence of motion in the path detection region. For example, in response to detecting absence of motion in the path detection region, the first sensor block can: capture an initial sequence of frames; detect an initial constellation of objects; and transmit an initial container representing the initial constellation of objects to the computer system. Then, during a first time period in response to detecting motion in the path detection region, the first sensor block can: capture a first sequence of frames at the first frame rate; detect a second constellation of objects; derive a set of object paths representing movement of the second constellation of objects based on positions of the second constellations of objects; and transmit the first set of object paths to the computer system. Finally, during a second time period, at the first sensor block, in response to detecting absence of motion in the path detection region, the first sensor block can: transition the first camera to the baseline frame rate and capture a second sequence of frames at the first camera. Then, for each frame in the second sequence of frames, the first sensor block can: detect a third constellation of objects in the frame; and transmit a first container representing the third constellation of objects detected in the frame to the computer system.

Additionally or alternatively, in this example the first sensor block can maintain the first camera at the first frame rate instead of transitioning to the baseline frame rate. During the second time period, in response to detecting motion in the path detection region, the first sensor block can: capture a second sequence of frames at the first camera at the first frame rate; detect a third constellation of objects in the second sequence of frames; derive a second set of object paths representing movement of the third constellation of objects within the field of view of the first camera based on positions of the third constellation of objects detected in the second sequence of frames; and transmit the second set of object paths to the computer system.

Similarly, the second sensor block can implement this first method and technique in response to detecting motion in the human counter region. For example, in response to detecting motion in the human counter region, the second sensor block can: capture a first frame at the baseline frame rate at the second camera; detect a first constellation of objects including a first set of humans; calculate a first quantity of humans based on the first set of humans; and transition the camera to a first frame rate, greater than the baseline frame rate, based on the first quantity of humans. Then, during the first time period in response to detecting motion in the human counter region, the second sensor block can: capture a second frame at the second camera at the first frame rate; detect a third constellation of objects in the second frame, the third constellation of objects including a second set of humans; calculate a second quantity of humans based on the second set of humans; and, in response to the second quantity of humans falling below a human quantity threshold, transition the second camera to the baseline frame rate.

Additionally or alternatively, during the first time period, the second sensor block can transition the second camera to a second frame rate based on the second quantity of humans. For example, in response to the second quantity of humans exceeding the human quantity threshold, the second sensor block can transition the second camera to a second frame rate, greater than the baseline frame rate and the first frame rate.

In another variation, the path detection region within the first field of view of the first camera arranged in the first sensor block can include a hallway, and the human counter region within the second field of view of the second camera arranged in the second sensor block can include a conference room abutting the hallway. The second sensor block can then maintain the second camera at the baseline frame rate according to a human quantity threshold for the conference room.

For example, the first sensor block can detect absence of motion in the path detection region including a hallway, and the second sensor block can detect motion in the human counter region including a conference room abutting the hallway. Then the second sensor block can: calculate the first quantity of humans falling below a human quantity threshold for the conference room; and, in response to the first quantity of humans falling below the human quantity threshold for the conference room, maintain the second camera at the first frame rate.

Therefore, the sensor block can implement the methods and techniques described above to detect constellations of objects; calculate a quantity of humans; and, as a function of (e.g., proportional to) human count, transition the frame rate of the camera and derive object paths representing movement of the constellation of objects.

8.4 Single Sensor Block: Defined Regions+Frame Rate+Motion

In another implementation, a sensor block of the population of sensor blocks can be deployed in the workplace. The camera arranged in the sensor block can define a field of view intersecting a path detection region and a human counter region abutting the path detection region. Then, the sensor block can transition the frame rate of the camera based on the quantity of humans and/or based on the presence or absence of motion in both the path detection region and the human counter region.

In one variation, the sensor block can implement the method and techniques described above in response to detecting absence or presence of motion in both the path detection region and the human counter region. For example, during an initial time period, in response to detecting absence of motion in the path detection region and the human counter region, the sensor block can capture an initial sequence of frames at a baseline frame rate at a camera arranged in the sensor block. Then, for each frame in the initial sequence of frames, the sensor block can: detect an initial constellation of objects in the frame; and transmit a container representing the initial constellation of objects detected in the frame to a computer system. Next, during a first time period, in response to detecting motion in the human counter region and, in response to detecting absence of motion in the path detection region, the sensor block can: capture a first sequence of frames at a first frame rate greater than the baseline frame rate; detect a first constellation of objects intersecting the human counter region within the first sequence of frames, the first constellation of objects including a first set of humans; calculate a first quantity of humans present in the human counter region based on the first set of humans in the first sequence of frames; and transmit the first quantity of humans to the computer system. Later during a second time period, in response to detecting motion in the path detection region, the sensor block can: capture a second sequence of frames at the first camera at a second frame rate greater than the first frame rate and the baseline frame rate; detect a second constellation of objects intersecting the path detection region within the second sequence of frames; derive a first set of object paths representing movement of the second constellation of objects within the path detection region based on positions of the second constellation of objects detected in the second sequence of frames; and transmit the first set of object paths to the computer system.

Additionally or alternatively, during the second time period, in response to detecting motion in the path detection region, the sensor block can: calculate a second quantity of humans present in the human counter region based on humans detected represented in the second constellation of objects; and transmit the second quantity of humans to the computer system.

Furthermore, during a third time period, in response to detecting motion in the human counter region and in response to detecting motion in the path detection region, the sensor block can: capture a third sequence of frames at the first frame rate greater than the baseline frame rate; detect a third constellation of objects intersecting the human counter region within the third sequence of frames, the third constellation of objects including a second set of humans; and calculate a second quantity of humans present in the human counter region based on the second set of humans in the third sequence of frames. Then, in response to the second quantity of humans exceeding a human quantity threshold for the human counter region, the sensor block can: capture a fourth sequence of frames at the second frame rate greater than the first frame rate and the baseline frame rate; detect the third constellation of objects intersecting the human counter region within the fourth sequence of frames; derive a second set of object paths representing movement of the third constellation of objects within the human counter region based on positions of the third constellation of objects detected in the fourth sequence of frames; and transmit the second quantity of humans and the second set of object paths to the computer system.

Therefore, the sensor block can be deployed within the workplace such that the camera defines a field of view intersecting a path detection region and a human counter region. Accordingly, the sensor block can adjust the frame rate of the camera in response to presence or absence of motion in the respective regions.

8.5 Single Sensor Block: Defined Regions+Frame Rate+Time

Generally, the sensor block can capture frames at the camera based on a particular schedule (e.g., continuously during working hours), in response to motion detected within a field of view of the camera and/or based on a particular time window according to the set of maps of the workplace described above. Furthermore, the sensor block can capture frames at the camera, in response to scheduled human presence within the region (e.g., based on a calendar of meetings in a conference room, continuously during a defined time window, during working hours).

In one variation, the sensor block can execute Blocks of the first method S100 for a human counter region to calculate a quantity of humans. In particular, the sensor block can: retrieve a map, from the set of maps in Block S130; detect the field of view intersecting a human counter region as defined in the map; and, in response to a particular time window assigned to the map intersecting the current operating time period of the sensor block, transition the frame rate of the camera.

For example, the sensor block can retrieve a first map, from a set of maps of the workplace, which defines a path detection region abutting a human counter region in the field of view of the camera, and the map can be assigned to a time window—such as before working hours (e.g., 6 AM-9 AM)—for human counting. Then, during a first time period, in response to detecting motion in the human counter region, the sensor block can: capture the first frame; detect the first constellation of objects intersecting the human counter region in the first frame; and, in response to the time window for human counting intersecting the first time period, transition the camera to the first frame rate greater than the baseline frame rate.

In another variation, the sensor block can execute Blocks of the first method S100 for the path detection region to derive a set of object paths. In particular, the sensor block can: retrieve a second map, from the set of maps; detect the field of view intersecting a path detection region, as defined in the second map; and, in response to a particular time window assigned to the second map intersecting the current operating time period of the sensor block, derive a set of object paths.

For example, the sensor block can retrieve a map, from the set of maps of the workplace, which defines a path detection region abutting a human counter region in the field of view of the camera, and the map can be assigned to a second time window—such as after working hours (e.g., 6 PM-6 AM)—for path detection. Then, in response to detecting motion in the path detection region, the sensor block can capture the second sequence of frames at the first frame rate and detect the second constellation of objects in the second sequence of frames intersecting the path detection region. Later, in response to the time window for path detection intersecting the second time period, the sensor block can derive the first set of object paths representing movement of the second constellation of objects within the path detection region based on positions of the second constellation of objects detected in the second sequence of frames.

Additionally or alternatively, the sensor block can execute Blocks of the first method S100 for the human counter region to calculate a quantity of humans and for the path detection region to derive a set of object paths. In particular, the sensor block can: retrieve a third map, from the set of maps in Block S130; detect the field of view intersecting a path detection region and a human counter region abutting the path detection region, as defined in the third map; and, in response to a particular time window assigned to the third map intersecting the current operating time period of the sensor block, transition the frame rate of the camera and derive a second set of object paths.

For example, during a third time period, the sensor block can retrieve a first map, from a set of maps of the workplace, which defines the path detection region abutting the human counter region in the field of view of the camera and the map can be assigned to a time window—such as during working hours (e.g., 9 AM-6 PM)—for path detection and human counting. Then, in response to the time window for human counting intersecting the third time period, the sensor block can transition the camera to the second frame rate greater than the first frame rate and the baseline frame rate. Similarly, in response to the time window for path detection intersecting the third time period, the sensor block can derive the second set of object paths representing movement of the third constellation of objects within the path detection region based on positions of the third constellation of objects detected in the fourth sequence of frames.

Therefore, the sensor block can implement the methods and techniques described above to detect constellations of objects; calculate a quantity of humans; and, as a function of (e.g., proportional to) time, transition the frame rate of the camera and derive object paths representing movement of the constellation of objects.

9. Engagement Classification

Generally, the sensor block can execute Blocks of the first method S100 to estimate a set of engagement events, occurring in a sequence of frames, based on locations and orientations of humans detected in the sequence of frames in Block S117.

In one variation, the sensor block can: implement the methods and techniques described above to capture a sequence of frames at the camera; detect a constellation of objects; calculate a quantity of humans in a human counting region, such as a conference room during a meeting; and then detect locations and orientations of humans in Block S117 to characterize a level of engagement of each human in Block S118 and estimate engagement events based on the level of engagement in Block S119.

For example, the sensor block can detect the constellation of objects including a set of humans in the sequence of frames. Then, for each human in the set of humans, the sensor block can: detect a location of the human in the sequence of frames; detect an orientation of the human in the sequence of frames; estimate a level of engagement of the human based on the location of each human in the second set of humans and the orientation of each human in the second set of humans; and estimate an engagement event in the second sequence of frames based on the level of engagement of each human in the second set of humans. Next, the sensor block can: derive the first set of object paths representing movement of the set of humans within the field of view of the camera based on locations and orientations of the set of humans detected in the sequence of frames; and transmit the first set of object paths and the engagement event to the computer system.

Additionally or alternatively, the sensor block can estimate the engagement level as a function of peak human density in the human counter region (e.g., conference room), since high human density (i.e., humans in close proximity) may suggest that these humans are more engaged and working together. For example, the sensor block can: estimate the engagement event in the sequence of frames based on the level of engagement of each human in the second set of humans and based on a second quantity of humans in the second set of humans.

Furthermore, the sensor block can also characterize a higher level of engagement of each human, for the current meeting, if the sensor block determines that humans detected in the human counting region (e.g., conference room) are facing each other. Additionally, the sensor block can detect the body and/or face of each human and calculate an anteroposterior axis—along a horizontal plane and normal to the detected body and/or face—of each human. For example, the sensor block can: estimate an anteroposterior axis of the human; characterize alignments between the anteroposterior axis of the human and anteroposterior axes of other humans in the second set of humans; detect the human is facing a second human, in the second set of humans, based on alignments and proximities of the anteroposterior axis of the human and anteroposterior axes of other humans in the second set of humans; and, in response to detecting the human facing a second human in the second set of humans, increasing the level of engagement estimated for the human.

In one variation, the computer system can receive the set of engagement events and extract classifications of the events, based on a set of object paths, representative of asset usage within an agile work environment that cannot be accurately identified based on static images. For example, the computer system can detect a human attempting to access a conference room and discovering the conference room is not available (e.g., conference room access attempt failure) based on a path of a human approaching a conference room, pausing, and exiting the path detection region (e.g., hallway, thoroughfare). Likewise, the computer system can detect a successful attempt to access a conference room by detecting the intersection of a path of a human with a conference room door. Similarly, the computer system can detect attempts (e.g., success and failure attempts) to acquire an agile desk in an agile desk environment and attempts to utilize an asset located in the path detection region (e.g., a coffee maker, a printer, a refrigerator). The computer system can identify these engagement events based on the temporal-spatial context represented by the path of the human as the human moves through the path detection region, which is not available when analyzing static images. Thus, the computer system can generate metrics including increases in demand for an asset in a facility, when demand is already sufficient for complete occupancy or utilization of the asset. For example, an administrator of the system can identify a shortage of agile desks by observing an increase in the number of attempted agile desk acquisitions detected by the computer system.

Additionally or alternatively, the sensor block can detect events relating to human movement within a region of the workplace such as sitting, standing, sitting conversation, standing conversation, entrance to the region, exit from the region, transitioning through the region (e.g., entrance followed immediately by exit), loitering (e.g., prolonged standing and walking within a small area of the region), engaged working (e.g., at a workstation or desk), conference room access attempt failure, conference room access attempt success, agile desk acquisition attempt failure, agile desk acquisition attempt success, asset use attempt failure, asset use attempt success, asset transportation or displacement, or any other state, event, or activity of humans and/or assets within the facility. Thus, the sensor block can detect engagement events, occurring within a region of the workplace, and the computer system can derive detailed insights about these events without revealing personally identifiable features of humans within the region.

10. Second Method

Figure 5:
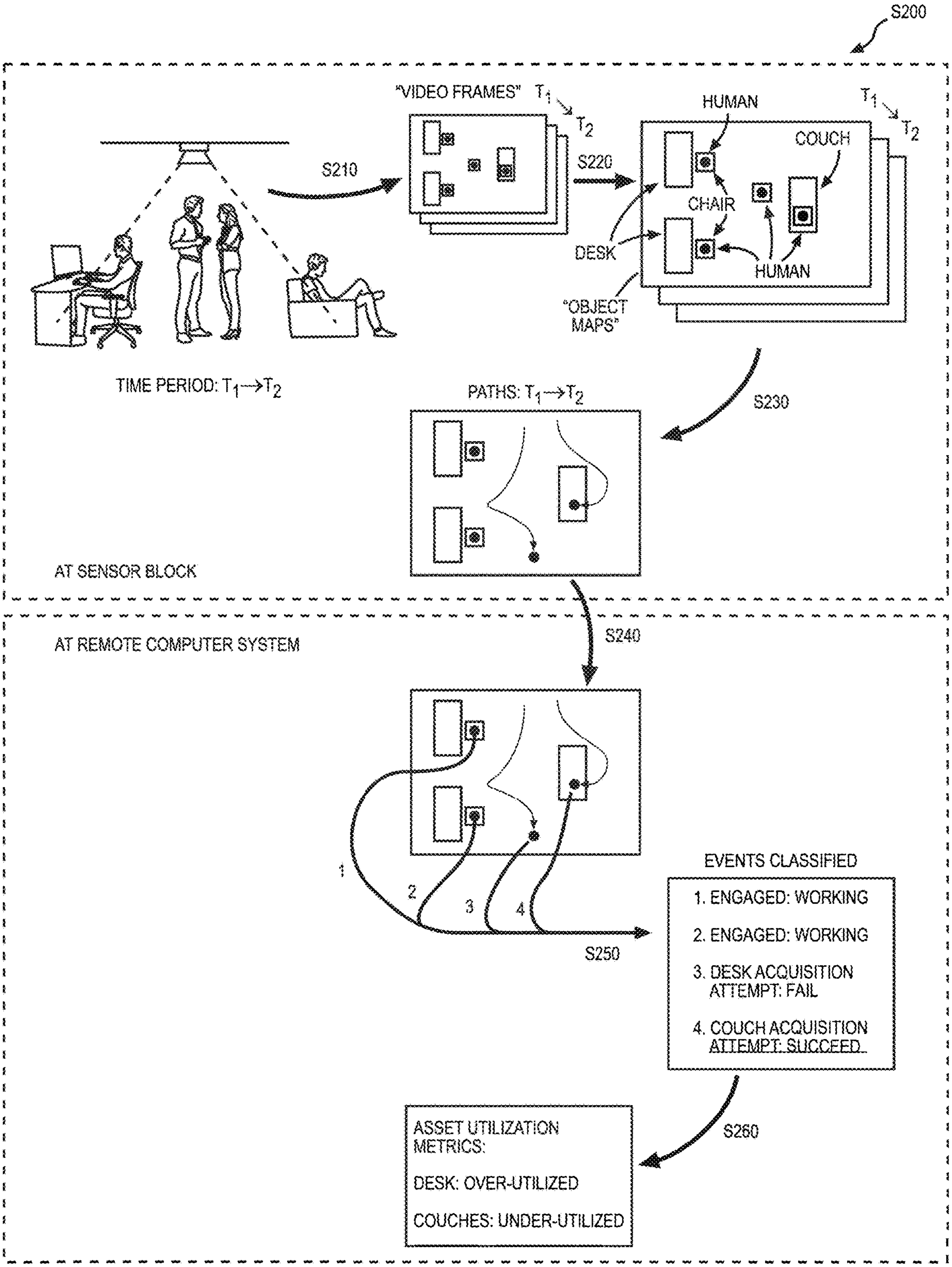
FIG. 5 is a flowchart representation of a second method.

As shown in FIG. 5, a second method S200 includes, at a sensor block: during a first time period, capturing a set of video frames depicting an area-of-interest, the area-of-interest encompassing a set of assets in Block S210; for each video frame in the set of video frames, classifying a set of objects within the video frame in Block S220; correlating classified objects detected within consecutive frames in the set of frames to generate a set of object paths for the first time period in Block S230; and transmitting the set of object paths for the first time period to a remote computer system in Block S240. The second method S200 also includes, at a remote computer system: classifying a set of events occurring during the first time period based on the set of object paths in Block S250; and calculating an asset utilization metric for the first time period based on the set of events in Block S260.

11. Applications

Figure 6:
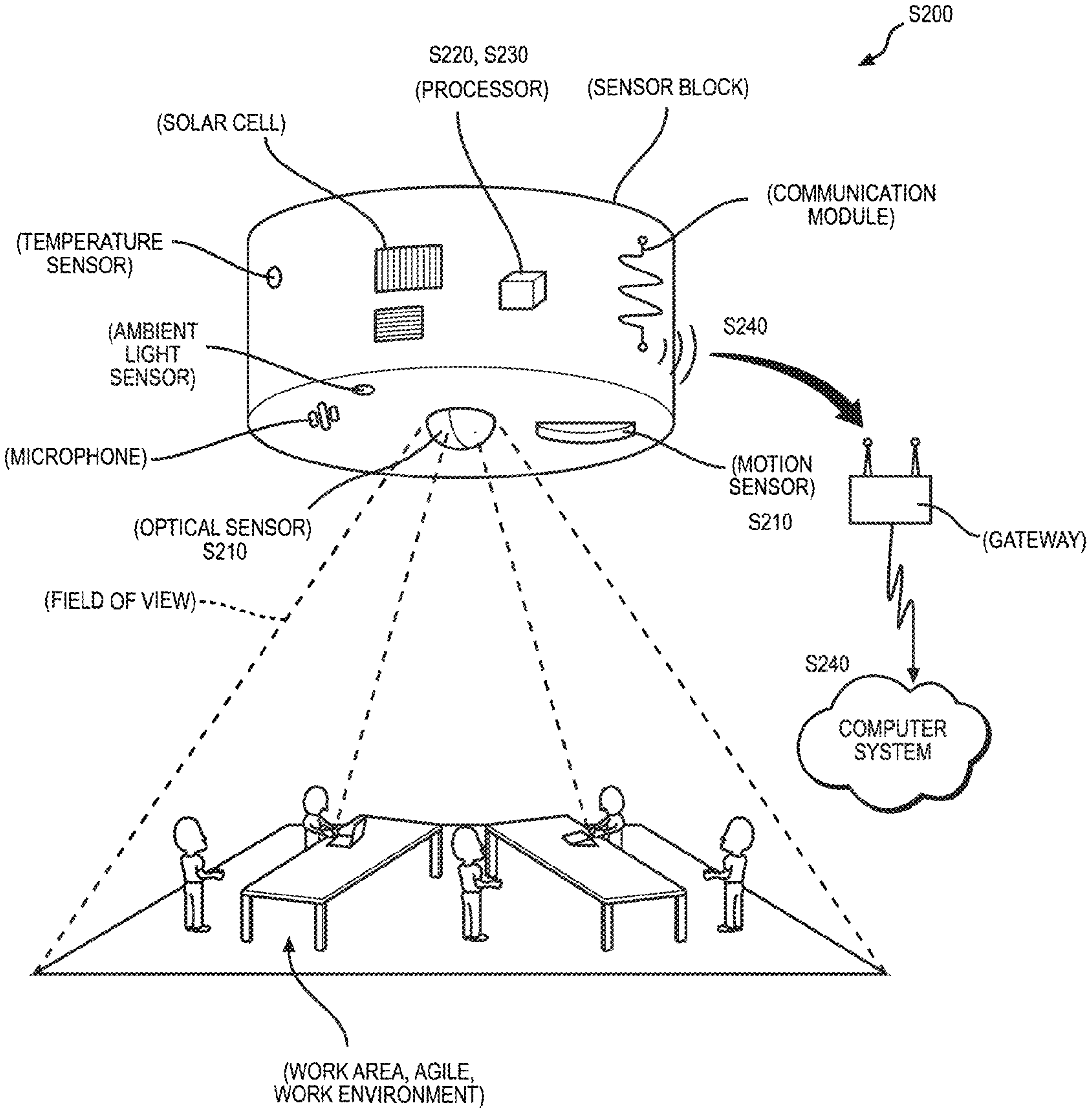
FIG. 6 is a schematic representation of a first system.

Generally, the second method S200 can be executed by a population of sensor blocks installed within an area-of-interest—such as within a conference room, an agile work environment, a cafeteria, or a lounge, etc. within a facility—in order to: capture a video feed depicting the area-of-interest; extract paths of objects (e.g., humans) moving throughout or occupying the area-of-interest relative to various assets (e.g., agile desks, conference room entrances, lounge regions) in the area-of-interest; classify a set of events occurring during the duration of the video; and calculate a set of asset-utilization metrics (in addition to other metrics) for the assets within the area-of-interest. More specifically, the second method S200 distills a video feed captured by a sensor block into an anonymized set of paths through the area-of-interest, which is then transferred and analyzed by a remote computer system to classify these paths as corresponding to particular events that may occur in the workplace. As shown in FIG. 6, Blocks of the second method S200 can be executed by a system including: a population of sensor blocks deployed throughout the facility; a remote computer system that updates schedulers, serves prompts for managers or administrators based on occupancy changes and states of spaces within the work area, and/or triggers various actuators within the facility based on data received from this population of sensor blocks; and local gateways arranged throughout the facility and configured to pass data between these sensor blocks and the remote computer system. Thus, the system can compress video feeds captured at sensor blocks into an information-dense path-based format, thereby enabling built-in anonymization of humans depicted in the video, improved video-data management, and faster classification that is less prone to overtraining.

The system can execute Blocks of the second method S200 within over-allocated and/or agile workspaces with a limited number of assets of various types. Although periodic static image capture can detect instantaneous states of a workspace—thereby detecting occupancy or vacancy (utilization or non-utilization) of various assets in the workspace—the second method S200 can detect transient events representing unmet needs of humans within the workspace. For example, by extracting paths from video feeds, the system can detect humans attempting to access a conference room, agile desk, lounge chair, recreational asset, kitchen appliance etc. and discovering the asset is not available due to prior occupancy. Thus, the system can identify these transient events based on context of a human's path through the area-of-interest relative to various assets within the area of interest that cannot be gleaned from images taken at slower time intervals (e.g., greater than a one-second interval). The system can then calculate metrics indicating unmet demand for particular assets that would otherwise go undetected.

Likewise, the system can identify transient events that are indicative of a well-functioning workplace. For example, the system can separately detect (e.g., via a pose detection model) the path and/or orientation of various limbs of a human, distinct from a centroid of a human, in order to identify the attention of the human relative to assets or other humans within the area-of-interest. For example, the system can detect a social interaction between two humans within the workplace based on an intersection between the paths of these humans and by detecting that the attention of each human is on the other human based on their respective poses. Thus, the system can quantify complex concepts, such as collaboration and level-of-focus, that are often target outcomes of flexible work environments. Thus, the system enables workplace or facility administrators to make educated adjustments to the quantity or position of assets within a workplace in order to increase productivity and reduce distractions.

Additionally, by compressing a video feed into a path-based data format, the system can the reduce the data transport and storage overhead required to manage a large deployment of video-capable sensor blocks within a workplace while maintaining or improving (by reducing noise in the video feed) the quality of inferences calculated from the video feed. Furthermore, by generating the path-based representation of the video feed of a sensor block at the sensor block, the system ensures that any potentially identifiable human features are removed from the representation of the video feed prior to transfer of the representation of the video feed from a sensor block to a remote computer system. Thus, the system can satisfy privacy concerns associated with a deployment of video capable sensors within a workplace.

11.1 Terms

The second method S200 is described herein as executed by a system to detect or identify "human effects" within the field of view of the video-capable optical sensor in the sensor block. The system can detect "human effects" that can include personal items or other objects carried by humans in a workplace environment and that are detectable via Blocks of the second method S200 described below. These detectable "human effects" or personal items can include but are not limited to: laptop computers; tablet computers; smartphones, keyboards; electronic mice; charging and/or data transfer cables; beverage and/or food containers such as lunch boxes, thermoses, coasters; utensils such as plates, bowls, forks, knives, spoons; tissues, napkins and/or other sanitary supplies; personal fans; headphones; earphones; paperweights; staplers; personal plants; clothing such as shoes, jackets, hats, and/or other wearable accessories; eye glasses; glasses cleaners; glasses cases; virtual reality goggles; seat cushions; tools such as hand tools and straight edges; keys and keychains; wallets; pens or pencils; erasers; books; booklets; notebooks; notepads; sticky-notes; loose paper; organizational tools such as mail trays, folders, and/or binders; lamps; clocks; and/or whiteboards.

Additionally, the system can identify intransient assets (i.e. fixed assets) or transient assets (i.e. mobile assets) within the area-of-interest. More specifically, the system can: access a spatial mapping of intransient assets in the area-of-interest (e.g., specifying pixel locations within the field of the view of the video-capable optical sensor) while dynamically identifying transient assets via an object classification model.

Furthermore, the system can also classify unidentifiable objects as "human effects" based solely on these object's context within images recorded by the system. More specifically, the system can, in response to failure to identify an object as a "human effect," a mobile asset, or a fixed asset, classify objects as "human effects" based on the presence of these objects on a desk, in a conference room, or proximal to another object classified as a "human effect" without specifically classifying the object as one of the categories of "human effects" described above. Thus, the system can classify an unidentifiable object as a "human effect" based only on the object's location relative to other detected objects or features within an image of an agile work environment or a conference room.

The second method S200 is described herein as executed by a system to detect humans and human effects "proximal" or "proximal to" objects or locations within a work environment. Generally, the phrase "a first object proximal to a second object" refers to presence of the first object within a threshold distance (e.g., two meters) of the second object or within a predefined area associated with the second object (e.g., a surface of a desk and a rectangular area in front of the desk). The system can execute Blocks of the second method S200 in response to detecting objects within a threshold distance or predefined area defined in association with the particular objects described as "proximal to" one another. In one example, the system can detect or identify "proximity" of a human or human effect to a desk within a work environment in response to the human or the human effect being located within three feet of the outer edge of the desk and desk chair associated with the desk. In another example, the system can detect or identify "proximity" of a human or a human effect in response to the human or the human effect being located within a predefined area delimited by a five-foot by eight-foot region overlapping the front of the desk. In yet another example, the system can detect or identify "proximity" of a human or human effect to a desk within a work environment in response to the human or the human effect being located within a statistically relevant area around the desk as indicated by machine learning models utilized to detect occupancy at the desk. In an additional example, the system can detect or identify "proximity" between two objects, both located on the surface of a desk in response to a first object being located within a ten-centimeter radius of a second object. Thus, the system can detect that a first object is "proximal" or "proximal to" a second object based on the specific objects being detected and these objects' context relative to the agile work environment.

12. System

As shown in FIG. 6, the system executing the second method S200 includes a set of sensor blocks installed within a workspace, a set of local gateways in communication with the set of sensor blocks, and a remote computer system communicating with the set of local gateways. In one implementation, the system can include the set of sensor blocks communicating directly with the remote computer system. In another implementation, the second method S200 can be executed locally at each individual sensor block deployed within the work environment. Each component of the system is described in further detail below.

12.1 Sensor Block

As shown in FIG. 6, a sensor block can include: a video-capable optical sensor defining a field of view within an area-of-interest; a motion sensor configured to detect motion in or near the field of view of the optical sensor; a processor configured to extract data from images recorded by the optical sensor; a wireless or wired communication module configured to transmit data extracted from images; a battery or wired power supply configured to power the video-capable optical sensor, the processor, and the wireless communication module; and an housing configured to contain the video-capable optical sensor, the motion sensor, the processor, the communication module, and the power supply and configured to mount to a surface in order to define a field of view of the video-capable optical sensor intersecting an area-of-interest within the facility (e.g., a conference table within a conference room, a cluster of agile desks in an agile work environment)

The optical sensor can include: a color video-capable camera configured to record and output a set of 2D color video frames (e.g., at a rate of at least one frame per-second); and/or a depth camera configured to record and output a set of 2D depth images or 3D point clouds. However, the optical sensor can define any other type of optical sensor and can output visual or optical data in any other format.

The motion sensor can include a passive infrared sensor (or "PIR" sensor) that defines a field of view that overlaps the field of view of the optical sensor and that passively outputs a signal representing motion within (or near) the field of view of optical sensor. As described above, the sensor block can transition from an inactive state to an active state responsive to an output from the motion sensor indicating motion in the field of view of the motion sensor; the sensor block can then trigger the optical sensor to record a set of video frames, which may capture a source of the motion detected by the motion sensor.

In one example, the motion sensor is coupled to a wake interrupt pin on the processor. However, the motion sensor can define any other type of motion sensor and can be coupled to the processor in any other way.

In one variation, the sensor block also includes: a distance sensor (e.g., a 1D infrared depth sensor); an ambient light sensor; a temperature sensor; an air quality or air pollution sensor; and/or a humidity sensor. However, the sensor block can include any other ambient sensor. The sensor block can sample and record data from these sensors and can selectively transmit these data—paired with path-based data extracted from video frames recorded by the video-capable optical sensor—to a local gateway. The sensor block can also include a solar cell or other energy harvester configured to recharge the battery.

The processor can locally execute the second method S200, as described above and below, to record sets of video frames via the optical sensor, to identify paths of humans and/or objects in the set of video frames, and to then enqueue data representing these paths at the communication module to transmit these insights to a nearby gateway for distribution to the remote computer system.

The video-capable optical sensor, motion sensor, battery, processor, and wireless communication module, etc. can be arranged within a single housing configured to install on a flat surface—such as by adhering or mechanically fastening to a wall or ceiling—with the field of view of the video-capable optical sensor facing outwardly from the flat surface and intersecting an area of interest within the facility.

However, this "standalone," "mobile" sensor block can define any other form and can mount to a surface in any other way.

12.1.1 Wired Power and Communications

In one variation, the sensor block additionally or alternatively includes a receptacle or plug configured to connect to an external power supply within the facility—such as a power-over-Ethernet cable—and sources power for the video-capable optical sensor, processor, etc. from this external power supply. In this variation, the sensor block can additionally or alternatively transmit data—extracted from images recorded by the sensor block—to the remote computer system via this wired connection (i.e., rather than wirelessly transmitting these data to a local gateway).

12.2 Local Gateway

As shown in FIG. 6, the system can also include a local gateway: configured to receive data transmitted from sensor blocks nearby via a wireless or wired communication protocol or via a local ad hoc wireless network; and to pass these path-based data to the remote computer system, such as over a computer network or long-range wireless communication protocol. For example, the gateway can be installed near and connected to a wall power outlet and can pass data received from a nearby sensor block to the remote computer system in (near) real-time. Furthermore, multiple gateways can be installed throughout the facility and can interface with many sensor blocks installed nearby to collect data from these sensor blocks and to return these data to the remote computer system.

In one variation, a sensor block transmits a path-based summary of a video feed—recorded by the optical sensor in the sensor block during a scan cycle executed by the sensor block while in the active state—to a nearby gateway, and the gateway executes the second method S200 and techniques described above and below to extract insights from this image and to return these insights to the remote computer system (e.g., sans the raw or compressed image). Alternatively, the sensor block transmits a series of object locations and classifications, each representing a video frame in a set of video frames, and the system can generate the path-based representation of the video feed at a local gateway or at the remote computer system.

12.2 Remote Computer System

As shown in FIG. 6, the remote computer system—such as a remote server—can receive non-optical data (e.g., object locations and classifications and/or a path-based representation of a video feed) from one or more gateways installed in the facility (or directly from sensor blocks) and can manipulate these non-optical data to generate long-term insights and/or real-time outputs according the second method S200 described below.

12. Installation and Initialization

Generally, an administrator of the system can install a sensor block such that the field of view of the video-capable optical sensor of the sensor block encompasses an area-of-interest. Additionally, upon installation of the sensor block over the area-of-interest, the system can prompt the sensor block to capture an initialization image of the area-of-interest in order to identify static assets within the area-of-interest and/or to label various regions of the area-of-interest (defined by pixel regions within the field of view of the video-capable optical sensor) with locational context. Thus, the system can leverage locational context based on the initialization image to inform the object classification and path classification of the second method S200 described below.

The system can prompt the sensor block to capture an initialization image at a time when the area-of-interest is known to be vacant and in a default state (e.g., after cleaning or maintenance is performed within the area-of-interest, after working ours). In one implementation, the system can record multiple initialization images in multiple lighting conditions to better facilitate object classification across these lighting conditions.

In one implementation, the system can automatically (e.g., via an object classification model) classify various static assets within the area-of-interest (e.g., desks, couches, printers/copiers, kitchen appliances, doors to other spaces in the facility) based on an initialization image captured by the sensor block. Alternatively, an administrator of the system can manually label static assets within the area-of-interest for future reference by the system.

In another implementation, the system can automatically (e.g., via a locational context model) classify regions of the area-of-interest as corresponding to particular location types in a set of location types based on an initialization image. For example, the set of location types can include, conference room, agile desk area, recreational area, hallway, kitchen, etc. Alternatively, an administrator of the system can manually label various regions of the area-of-interest as a location type in the set of location types. Thus, the system can generate or access locational context within the area-of-interest in order to inform object and/or path classification models further described below.

14. Video Capture

Generally, during a given time period, the system can capture a set of video frames depicting an area-of-interest. The system can capture video frames based on a particular schedule (e.g., continuously during working hours) or in response to motion detected within the area-of-interest by the motion sensor. Additionally, the system can prompt a sensor block to record video frames, in response to scheduled human presence within the area of interest (e.g., based on a calendar of meetings in a conference room). Thus, the system can ensure that the sensor block captures relevant human activity, while reducing power and data overhead of the system, while no humans are present within the area-of-interest.

In one implementation, the sensor block can record video frames at a frequency greater than one hertz in order to properly detect paths of objects and/or humans moving through the area-of-interest. In another implementation, the sensor block does not permanently store video frames including optical data and instead converts these video frames into an object map immediately upon capture by the video-capable optical sensor. In yet another implementation, the sensor block can temporarily and locally store video frames until the sensor block has generated an object map based on the video frame, at which time, the sensor block can delete the video frame from temporary storage. Thus, the sensor can reduce the possibility of accessing or recovering the optical data captured by the sensor block, thereby addressing privacy concerns related to the deployment of the sensor blocks within the facility.

Alternatively, the sensor block is configured to record low-resolution video frames and transmit these complete video frames to a gateway or the remote computer system for later object classification and conversion to an object map.

15. Object Classification

Generally, for each video frame in the set of video frames, the system can classify a set of objects within the video frame. More specifically, the system (either locally at the sensor block, at a gateway, or the remote computer system) can execute an object classification model on each video frame in the set of video frames to transform the set of video frames into a set of object maps representing the location and/or orientation (i.e., the position) of each object detected with the area-of-interest. Thus, by generating a series of object maps representing a set of video frames, the system can detect paths of objects and/or humans as the position of these objects and/or humans change over multiple consecutive object maps.

The system can execute a generalized object classification model, or a specialized object classification model trained to classify objects within the particular facility to which the system is deployed and/or to identify objects from an overhead perspective characterizing the video frames captured by the sensor blocks of the system. The system can execute the object classification model on a video frame and output a classification vector and a position vector for each object detected (with greater than a threshold confidence) within the video frame. The classification vector can identify the type of object detected by the object classification model and the confidence with which this object was classified by the object classification model. The position vector can define an origin (in 2D or 3D space) of the object detected by the object classification model with the area-of-interest. Additionally or alternatively, the position vector can identify the orientation of the object and/or a bounding box defining the area or volume occupied by the object detected by the object classification model. Thus, the system, via execution of the object classification model, can detect and classify common objects (including static or transient assets) within the facility, thereby representing video frames captured by the sensor blocks as compressed, signal-dense, and anonymized object maps that can be further processed (as described below) to detect events occurring within the area-of-interest in real-time.

15.1 Pose Detection

In one variation, the system can detect and classify human appendages (e.g., arms, legs, hands, feet) distinct from a main body in order to detect the pose of the human and/or the activity being performed by the human in a video frame. In this variation, the system can generate a distinct classification vector and position vector for each appendage detected in a video frame. Thus, by identifying the pose of each human depicted in a video frame, the system can generate additional contextual data for processing according to subsequent Blocks of the second method S200.

16. Path Extraction

Generally, upon generating a series of consecutive object maps representing a series of consecutive video frames, the system can correlate objects in consecutive object maps to generate an object path representing movement of the object through the area-of-interest. Given a sufficiently high frame rate of video frames recorded by the sensor block (e.g., faster than one frame-per-second), the system can accurately track objects across frames and generate paths representing the movement of these objects, which would not be possible for similarly deployed static image-based sensor blocks.

In particular, the system correlates an object present in multiple images based on a classification vector associated with the object and/or based on positional overlap of the object in consecutive frames. Thus, the system can track objects within the area-of-interest, assuming there is sufficient alignment and/or overlap in the location and orientation of an object in consecutive frames. Therefore, an administrator of the system can tune the frame rate of the optical sensor (or select optical sensor hardware) to capture movement up to a predetermined expected speed. For example, assuming a one-meter bounding box dimension for humans detected within the video frame and an estimated speed of a human of one meter-per-second, the system can select a frame rate of one hertz or faster to ensure bounding box overlap of a human detected in consecutive images.

Once the system has correlated objects across multiple consecutive object maps to identify these objects as a single mobile object, the system can generate an object path for the object by interpolating a line through the centroid of the object detected in consecutive video frames. The system can execute this interpolation step via any interpolation or smoothing algorithm and can represent the position of this path within the area-of-interest according to any data format. For example, the system can represent an object path as a vector, a function, or a series of positions.

In one implementation, the system can also extract object paths from consecutive object maps that represent the orientation of the object within each object map. In another implementation, the system can extract object paths that represent the bounding box of the object as it moves through space. In yet another implementation, the system can distinctly extract object paths for human appendages associated with a human represented in consecutive object maps in addition to an object path corresponding to the centroid of the human.

The system can define an object path based on a predefined buffer of recent object maps. For example, the system can extract paths from a series of object maps representing the last 20 seconds of video frames captured at the sensor block. Alternatively, the system can define an object path as complete or incomplete based on whether the object is currently present within the area-of-interest. In this implementation, the system can classify the object path while incomplete or upon completion of the object path (when the object exits the field of view of the sensor block or is no longer visible within the area-of-interest).

17. Transmission to Gateway

Generally, the sensor block can transmit the series of object maps representative of the set of video frames, or the set of object paths extracted from the series of object maps to a gateway and/or the remote computer system. Thus, the system can ensure that data representative of video frames recorded by the sensor block is anonymized prior to transfer to the gateway and/or the remote computer system. However, in one implementation, video frames are transmitted to the remote computer system directly upon capture by the sensor block.

In one implementation, the sensor block transfers object maps to the gateway or remote computer system upon generation of the object map (or shortly thereafter) at the sensor block. Alternatively, the sensor block can locally extract a set of object paths from the series of object maps and periodically transfer the set of object paths to the gateway or remote computer system.

18. Path Classification

Generally, the system can identify and/or classify a set of events or activities occurring during the time period corresponding to the set of video frames based on the set of object paths. The system can detect states, actions, and events relating to human movement and/or asset movement within the area-of-interest such as: sitting, standing, sitting conversation, standing conversation, entrance to the area-of-interest, exit from the area-of-interest, transitioning through the area-of-interest (i.e., entrance followed immediately by exit), loitering (i.e., prolonged standing and walking within a small region), engaged working (e.g., at a workstation or desk), conference room access attempt failure, conference room access attempt success, agile desk acquisition attempt failure, agile desk acquisition attempt success, asset use attempt failure, asset use attempt success, asset transportation or displacement, or any other state, event, or activity of humans and/or assets within the facility. Thus, the system can utilize the low-overhead and information-dense set of object paths to derive detailed insights into activities and events occurring within an area-of-interest, all without revealing personally identifiable features of humans within the area-of-interest.

Additionally, as opposed to classifying events based on an object path in isolation, the system can classify events based on the locational context of the set of object paths relative to each other and relative to labeled static assets and/or regions within the area-of-interest. For example, the system can classify events based on the interactions (i.e., collision or overlap) of two paths in the set of paths. In another example, the system can classify an event based on the intersection of a path and a static asset. In yet another example, the system can classify an event based on a path overlapping with a particular labelled region within the area-of-interest. Thus, by leveraging labeled and/or detected aspects of the area-of-interest, the system can more accurately identify events based on this location context.

The system can classify a set of events and/or activities based on a set of object paths via execution of a path classification model. In one implementation, the path classification model is a supervised machine learning model trained on labeled paths representative of particular events or activities of interest. By training the path classification model based on classified object paths, assets, and labeled regions within the area-of-interest, the system can reduce likelihood of overtraining (by striping noise from the set of video frames prior to event classification) and improve the applicability of the model across a variety of area-of-interests.

In one implementation, the system can execute a path classification model that identifies events currently in progress and completed events based on the set of object paths. Thus, the system can identify multiple events or activities applicable to a single object or human detected with the area-of-interest. For example, the system can detect a path of a human intersecting with the path of another human and assign the activities of "standing" and "conversing" to each human. In another example, a path of a human can initially be classified as an entrance (upon entry of the human into the area-of-interest), then as an attempted conference room access (upon walking within a threshold distance or region associated with a conference room door), then as an exit (upon leaving the area-of-interest). Therefore, depending on the time at which the system classified the path, the system can extract one, two, or three classifications based on the single object path.

In one implementation, the system reports an event or activity periodically (e.g., once per-five-seconds) based on a set of paths representative of a particular buffer period of time (e.g., the last 20 seconds). Alternatively, the system can report an event once upon first classification of the event and, in response to classifying the event again based on a subsequent set of object paths representative of a subsequent video frame captured by the sensor block, the system can refrain from reporting the event a second time. In another implementation, the system can periodically report activities or states of humans or assets detected based on the set of object paths while reporting events only once per event detected.

The system can detect and classify events representative of asset usage within an agile work environment that cannot be accurately identified based on static images. For example, the system can detect a human attempting to access a conference room and discovering the conference room is not available (i.e., conference room access attempt failure) based on a path of a human approaching a conference room, pausing, and exiting the area-of-interest. Likewise, the system can detect a successful attempt to access a conference room by detecting the intersection of a path of a human with a conference room door. Similarly, the system can detect attempts (including successes and failures) to acquire an agile desk in an agile desk environment and attempts to utilize an asset located in the area-of-interest (e.g., a coffee maker, a printer, a refrigerator). The system can identify these events based on the temporal-spatial context represented by the path of the human as he or she moves through the area-of-interest, which is not available when analyzing static images. Thus, the system can detect increases in demand for an asset in a facility, when demand is already sufficient for complete occupancy or utilization of the asset. For example, an administrator of the system can identify a shortage of agile desks by observing an increase in the number of attempted agile desk acquisitions detected by the system.

In one implementation, the system can also identify, for humans detected within the area-of-interest, a target of the human's attention in the area-of-interest. For example, the system can detect (based on the pose of the human identified over multiple consecutive frames) the direction that a human is looking and identify objects within a threshold viewing angle of that direction as being attended to by the human.

19. Activity Metrics

Generally, the system can calculate a metric for the time period represented by the set of object paths based on the set of events. Additionally, the system can access other facility- or work-related signals in order to correlate these signals with events occurring with the facility. Thus, the system can enable administrators of the facility to identify the effects of asset procurement and placement decisions on the productivity and/or satisfaction of humans within the facility.

In one example, the system can calculate the average dwell time of a human within a particular region of the area-of-interest or average dwell time of a human utilizing an asset in the area-of-interest (e.g., the average dwell time occupying a desk and/or the average dwell time within a conference room). In another example, the system can sum or average the number of entrances, exits, and transitional events recorded for the area-of-interest. In yet another example, the system can calculate a sit/stand ratio of humans within the area-of-interest. In yet another example, the system can calculate a focus or engagement score based on the average duration of a human's attention or focus on a target object (e.g., the average duration of human's attention directed toward a computer or towards a projector screen). In yet another example, the system can calculate a collaboration score based on a number or average number of interactions (i.e., conversation events) between humans within the area-of-interest. In yet another example, the system can categorize events as negative or positive events and calculate a summary productivity or satisfaction score, summarizing the productivity or satisfaction of humans within the area-of-interest.

In one implementation, the system can aggregate metrics calculated for each area-of-interest in a facility to calculate aggregated metrics for the facility or for subsections of the facility. The system can then access signals such as revenue or another measure of productivity, employee satisfaction, disciplinary actions, and can correlate these aggregate metrics with these facility signals. For example, the system can plot a revenue versus collaboration score curve for a facility.

20. Real-Time Outputs

In one variation, the system can generate real-time outputs in response to detecting events and or activities occurring within an area-of-interest. Because the system can execute the second method S200 with significantly lower latency than an image-based system (e.g., on the order of one second versus several minutes) the system can more quickly and effectively prompt responses to these events.

In one example, the system can detect a group or individual loitering outside of a conference room or near a set of agile desks. In this example, the system can dispatch an aid to direct the group to another conference room. In another example, the system can detect movement of an asset outside of a predefined region corresponding to the asset and, in response, deploy an aid to relocate or replace the displaced asset. In yet another example, the system can detect a fight or other violent interaction and, in response, prompt a security guard to address the incident.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
during a first time period, at a sensor block arranged in a space:
capturing a first set of depth data at a depth sensor arranged in the sensor block;
detecting a first set of objects in a first region of the space based on the first set of depth data, the first set of objects comprising a first set of humans;
deriving a first set of anonymized object paths representing movement of the first set of humans within a field of view of the depth sensor based on positions of the first set of humans detected in the first set of depth data; and
in response to deriving the first set of anonymized object paths, transmitting the first set of anonymized object paths to a computer system; and
during a second time period, at the sensor block:
in response to a first anonymized object path, in the first set of anonymized object paths, intersecting a second region abutting the first region of the space, capturing a second set of depth data at the depth sensor;
detecting a second set of objects in the second region based on the second set of depth data, the second set of objects comprising a second set of humans;
calculating a first human count in the second region based on the second set of humans; and
transmitting the first human count to the computer system.

2. The method of claim 1:
wherein calculating the first human count in the second region comprises calculating the first human count, representing a first quantity of humans present within the second region, based on the first set of humans; and
further comprising, at the computer system:
generating a total human count representing a total quantity of humans predicted to occupy the space; and
adjusting the total human count in the space based on the first human count in the second region of the space.

3. The method of claim 2:
further comprising during a third time period, at a second sensor block arranged in the space:
capturing a third set of depth data at a second depth sensor arranged in the second sensor block and facing a third region of the space;
detecting a second set of objects in the third region based on the second set of depth data, the second set of objects comprising a third set of humans;
calculating a second human count in the third region representing a second quantity of humans in the third region based on the third set of humans; and
transmitting the second human count to the computer system; and
wherein adjusting the total human count in the space comprises adjusting the total human count in the space based on the first human count in the second region and based on the second human count in the third region.

4. The method of claim 1:
further comprising, during the first time period, at the sensor block:
for each human in the first set of humans:
detecting a position of the human in the first set of depth data; and
characterizing a level of engagement of the human based on the position of the human; and
estimating an engagement event concurrent with the first set of depth data based on the level of engagement of each human in the first set of humans; and
wherein transmitting the first set of anonymized object paths to the computer system comprises transmitting the first set of anonymized object paths and the engagement event to the computer system.

5. The method of claim 1:
further comprising retrieving a first map, from a set of maps of the space:
defining a path detection region abutting a human counter region in the field of view of the depth sensor; and
assigned to a time window for human counting;
wherein detecting the first set of objects moving in the first region of the space comprises detecting the first set of objects intersecting the path detection region based on the first set of depth data;
wherein capturing the second set of depth data at the depth sensor comprises capturing the second set of depth data at the depth sensor:
in response to the time window for human counting intersecting the first time period; and
in response to the first anonymized object path in the set of anonymized object paths intersecting the human counter region; and
wherein calculating the first human count in the second region comprises calculating the first human count in the human counter region based on the second set of humans.

6. The method of claim 1:
further comprising, during the first time period, at the sensor block:
for each human in the first set of humans:

detecting a position of the human in the first set of depth data; and identifying an intersection between the position of the human and a doorway within the first region;

estimating a set of entry events concurrent with the first set of depth data based on the intersection of each human, in the first set of humans, with the doorway; and calculating a second human count in the first region based on the set of entry events; and wherein transmitting the first set of anonymized object paths to the computer system comprises transmitting the first set of anonymized object paths and the second human count to the computer system.

7. The method of claim 6:

further comprising, during the second time period, at the sensor block:

for each human in the second set of humans:

detecting a position of the human in the second set of depth data; and identifying an intersection between the position of the human and a second doorway within the second region; and estimating a second set of entry events concurrent with the second set of depth data based on the intersection of each human, in the second set of humans, with the second doorway;

wherein calculating the first human count in the second region comprises calculating the first human count in the second region based on the second set of entry events; and further comprising at the computer system, generating a total human count representing a total quantity of humans predicted to occupy the space based on the first human count in the first region and the second human count in the second region of the space.

8. The method of claim 1:

further comprising, during the first time period, at the sensor block:

capturing a first sequence of frames at an optical sensor arranged in the sensor block; and for each object in the first set of objects:

tracking the object in the first sequence of frames; and detecting a positional overlap of the object between consecutive frames in the first sequence of frames;

wherein detecting the first set of objects moving in the first region of the space based on the first set of depth data comprises detecting the first set of objects in the first sequence of frames, the first set of objects comprising the first set of humans;

wherein deriving the first set of anonymized object paths representing movement of the first set of humans comprises deriving the first set of anonymized object paths representing movement of the first set of humans within a field of view of the optical sensor based on positional overlaps of the first set of humans; and wherein capturing the second set of depth data at the depth sensor comprises:

capturing a second frame at the optical sensor; and detecting the first set of humans in the second frame.

9. The method of claim 8:

wherein capturing the first sequence of frames at the optical sensor comprises capturing the first sequence of frames at the optical sensor at a first frame rate; and further comprising:

during the second time period, at the sensor block, in response to the first human count falling below a threshold human count, transitioning the optical sensor to a baseline frame rate, less than the first frame rate; and during a third time period succeeding the first time period, at the sensor block, in response to detecting absence of motion in the second region of the space via the motion sensor:

capturing a second sequence of frames at the optical sensor at the baseline frame rate; and for each frame in the second sequence of frames:

detecting a second set of objects in the frame; and transmitting a container representing the second set of objects to the computer system.

10. The method of claim 8:

wherein capturing the first sequence of frames at the optical sensor comprises recording the first sequence of images at the optical sensor, the first sequence of images depicting the first set of humans in the first region of the space;

further comprising at the sensor block, removing personally identifiable features of the first set of humans from the first sequence of images, in response to deriving the first set of anonymized object paths; and wherein capturing the second set of depth data at the depth sensor comprises recording a second sequence of images at the optical sensor, the second sequence of images depicting the first set of humans in the second region of the space.

11. The method of claim 1:

wherein capturing the first set of depth data at the depth sensor comprises, in response to detecting motion in the first region of the space via a motion sensor arranged in the sensor block and facing a doorway in the first region, capturing the first set of depth data; and wherein capturing the second set of depth data at the depth sensor comprises capturing the second set of depth data:

in response to detecting motion in the second region of the space via the motion sensor, the motion sensor facing a second doorway in the second region; and in response to the first anonymized object path, in the first set of anonymized object paths, intersecting the second region abutting the first region of the space.

12. The method of claim 1:

further comprising at the sensor block, capturing a first set of positional data at a position sensor arranged in the sensor block, the first set of positional data representing positions of objects within the path detection region and annotated with timestamps;

wherein detecting the first set of objects moving in the path detection region based on the first set of depth data comprises detecting the first set of objects moving in the path detection region based on the first set of positional data; and wherein deriving the first set of anonymized object paths representing movement of the first set of humans comprises deriving the first set of anonymized object paths representing movement of the first set of humans within the field of view of the positional sensor based on positional overlaps of the first set of humans detected in the first set of positional data.

13. The method of claim 12:

further comprising, during the first time period, at the sensor block:

for each human in the first set of humans:

tracking a position of the human in the first set of positional data; and extracting a timestamp associated with the position of the human from the first set of positional data; and calculating a first set of dwell times representing durations of presence of the first set of humans within the first region of the space based on timestamps of the first set of humans; and wherein transmitting the first set of anonymized object paths to the computer system comprises transmitting the first set of dwell times and the first set of anonymized object paths to the computer system.

14. A method comprising:

during a first time period, at a sensor block:

capturing a first set of depth images at a depth sensor arranged in the sensor block, the first set of depth images representing movement of a first set of objects in a first region of the space;

for each object in the first set of objects:

tracking the object in the first set of depth images; and detecting a positional overlap of the object between consecutive images in the first set of depth images;

deriving a first set of anonymized object paths representing movement of the first set of humans within a field of view of the depth sensor based on positional overlaps of the first set of humans; and transmitting the first set of anonymized object paths to a computer system; and during a second time period, at the sensor block:

capturing a second set of depth images at the depth sensor, the second set of depth images representing movement of a second set of humans in a second region of the space;

for each human in the second set of humans:

detecting a position of the human in the second set of depth images; and identifying an intersection between the position of the human and a doorway within the second region;

estimating a set of entry events concurrent with the second set of depth images based on the intersection of each human, in the second set of humans, with the second doorway; and transmitting the set of entry events to the computer system.

15. The method of claim 14, further comprising at the computer system:

generating a total human count representing a total quantity of humans predicted to occupy the space;

calculating a first human count in the second region based on the set of entry events; and adjusting the total human count in the space based on the first human count in the second region of the space.

16. The method of claim 14, further comprising:

during the first time period, at the sensor block:

compiling the first sequence of depth images into a three-dimensional point cloud of the first region; and detecting the first set of humans moving in the first region based on the three-dimensional point cloud; and during the second time period, at the sensor block:

compiling the second sequence of depth images into a second three-dimensional point cloud of the second region; and detecting the second set of humans moving in the conference room based on the second three-dimensional point cloud.

17. The method of claim 14:

further comprising during the first time period, at the sensor block:

for each human in the first set of humans, characterizing a level of engagement of the human based on the position of the human; and estimating an engagement event concurrent with the first set of depth data based on the level of engagement of each human in the first set of humans; and wherein transmitting the first set of anonymized object paths to the computer system comprises transmitting the first set of anonymized object paths and the engagement event to the computer system.

18. The method of claim 14:

further comprising retrieving a first map, from a set of maps of the space:

defining a path detection region abutting a human counter region in the field of view of the depth sensor; and assigned to a time window for human counting; and wherein capturing the first set of depth images at the depth sensor comprises in response to the time window for path detection intersecting the first time period:

capturing the first set of depth images at the depth sensor, the first set of depth images representing movement of the first set of objects in the path detection region.

19. A method comprising:

during a first time period:

accessing a first set of depth data captured by a depth sensor arranged in a sensor block deployed in a space;

detecting a first set of objects in a first region of the space based on the first set of depth data, the first set of objects comprising a first set of humans; and deriving a first set of anonymized object paths representing movement of the first set of humans within a field of view of the depth sensor based on positions of the first set of humans detected in the first set of depth data; and during a second time period:

in response to a first anonymized object path, in the first set of anonymized object paths, intersecting a second region of the space, accessing a second set of depth data captured by the depth sensor;

detecting a second set of objects in the second region based on the second set of depth data, the second set of objects comprising a second set of humans;

calculating a first human count in the second region based on the second set of humans;

generating a total human count representing a total quantity of humans predicted to occupy the space; and adjusting the total human count in the space based on the first human count.

20. The method of claim 19:

further comprising during the second time period:

for each human in the second set of humans:

detecting a position of the human in the second set of depth data; and identifying an intersection between the position of the human and a doorway within the second region;

estimating a set of entry events concurrent with the second set of depth data based on the intersection of each human, in the second set of humans, with the doorway; and wherein calculating the first human count in the second region comprises calculating the first human count in the second region based on the set of entry events.

* * * * *